(12) United States Patent
Ogle et al.

(10) Patent No.: US 11,930,040 B2
(45) Date of Patent: *Mar. 12, 2024

(54) SECURITY TECHNIQUES FOR 5G AND NEXT GENERATION RADIO ACCESS NETWORKS

(71) Applicant: AT&T Intellectual Property I, L.P., Atlanta, GA (US)

(72) Inventors: Deon Ogle, Atlanta, GA (US); Yaron Koral, Cherry Hill, NJ (US); Cagatay Buyukkoc, Holmdel, NJ (US); Nicholas Arconati, St. Louis, MO (US); Jitendra Patel, Dardenne Prairie, MO (US); Bogdan Ungureanu, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,914

(22) Filed: Jan. 23, 2023

(65) Prior Publication Data

US 2023/0164177 A1 May 25, 2023

Related U.S. Application Data

(63) Continuation of application No. 16/847,031, filed on Apr. 13, 2020, now Pat. No. 11,588,850.

(51) Int. Cl.
*H04L 9/40* (2022.01)
*G06N 5/04* (2023.01)
(Continued)

(52) U.S. Cl.
CPC ........... *H04L 63/1458* (2013.01); *G06N 5/04* (2013.01); *G06N 20/00* (2019.01);
(Continued)

(58) Field of Classification Search
None
See application file for complete search history.

(56) References Cited

U.S. PATENT DOCUMENTS 8,255,994 B2 * 8/2012 Upadhyay ........... H04L 63/1458 713/153
9,363,278 B2 * 6/2016 Maria ................. H04L 63/1416
(Continued)

*Primary Examiner* — Michael Pyzocha
(74) *Attorney, Agent, or Firm* — Gutin & Gust, PLC; Matthew Tropper

(57) ABSTRACT

Malicious attacks by certain devices against a radio access network (RAN) can be detected and mitigated, while allowing communication of priority messages. A security management component (SMC) can determine whether a malicious attack against the RAN is occurring based on a defined baseline that indicates whether a malicious attack is occurring. The defined baseline is determined based on respective characteristics associated with respective devices that are determined based on analysis of information relating to the devices. In response to determining there is a malicious attack, SMC determines whether to block connections of devices to the RAN based on respective priority levels associated with respective messages being communicated by the devices. SMC blocks connections of devices communicating messages associated with priority levels that do not satisfy a defined threshold priority level, while managing communication connections to allow messages satisfying the defined threshold priority level to be communicated via the RAN.

20 Claims, 10 Drawing Sheets

(51) Int. Cl.
  *G06N 20/00* (2019.01)
  *H04W 12/00* (2021.01)
  *H04W 12/122* (2021.01)

(52) U.S. Cl.
  CPC ....... *H04W 12/009* (2019.01); *H04W 12/122* (2021.01); *H04L 2463/141* (2013.01)

(56) References Cited

U.S. PATENT DOCUMENTS

| | | | |
|---|---|---|---|
| 2006/0276173 A1* | 12/2006 | Srey | H04W 12/08 |
| | | | 455/410 |
| 2007/0002736 A1* | 1/2007 | Gade | H04W 12/126 |
| | | | 726/23 |
| 2010/0050255 A1* | 2/2010 | Upadhyay | H04W 12/12 |
| | | | 726/22 |
| 2010/0214996 A1* | 8/2010 | Santhanam | H04W 76/36 |
| | | | 370/329 |
| 2014/0082114 A1* | 3/2014 | Vadassery | H04W 72/56 |
| | | | 709/207 |
| 2016/0277926 A1* | 9/2016 | Molina | H04W 12/06 |
| 2016/0359823 A1* | 12/2016 | Ayyadevara | H04L 63/061 |
| 2016/0373467 A1* | 12/2016 | Thyni | H04L 63/1425 |
| 2018/0007084 A1* | 1/2018 | Reddy | H04L 63/1458 |
| 2019/0028493 A1* | 1/2019 | Endo | H04L 63/1416 |
| 2020/0021994 A1* | 1/2020 | Ranjbar | H04W 28/0215 |
| 2020/0195673 A1* | 6/2020 | Lee | H04L 45/70 |
| 2020/0320106 A1* | 10/2020 | Goldfarb | G06F 21/552 |
| 2021/0144555 A1* | 5/2021 | Kim | H04L 63/1408 |
| 2021/0306372 A1* | 9/2021 | Koral | H04L 43/16 |
| 2021/0321259 A1* | 10/2021 | Louafi | H04W 24/08 |
| 2022/0104114 A1* | 3/2022 | Garcia Martin | H04W 48/18 |
| 2022/0131966 A1* | 4/2022 | Cai | H04M 3/436 |

* cited by examiner

SECURITY TECHNIQUES FOR 5G AND NEXT GENERATION RADIO ACCESS NETWORKS

RELATED APPLICATION

The subject patent application is a continuation of, and claims priority to, U.S. patent application Ser. No. 16/847,031, filed Apr. 13, 2020, and entitled "SECURITY TECHNIQUES FOR 5G AND NEXT GENERATION RADIO ACCESS NETWORKS," the entirety of which priority application is hereby incorporated by reference herein.

TECHNICAL FIELD

This disclosure relates generally to electronic communications, e.g., to security techniques for 5G and next generation radio access networks.

BACKGROUND

Communication devices can communicate data to other communication devices via a communication network. For example, a wireless device (e.g., mobile, cell, or smart phone; or electronic tablet or pad) can connect to and communicate with a wireless communication network (e.g., core network), via a base station associated with the wireless communication network, to communicate with another communication device connected to the wireless communication network or to another communication network (e.g., Internet Protocol (IP)-based network, such as the Internet) associated with (e.g., communicatively connected to) the wireless communication network. The wireless device can, for instance, communicate information to a base station and associated wireless communication network (e.g., core network) via an uplink and can receive information from the base station (and associated wireless communication network) via a downlink.

The above-described description is merely intended to provide a contextual overview regarding electronic communications, and is not intended to be exhaustive.

DETAILED DESCRIPTION

Figure 1:
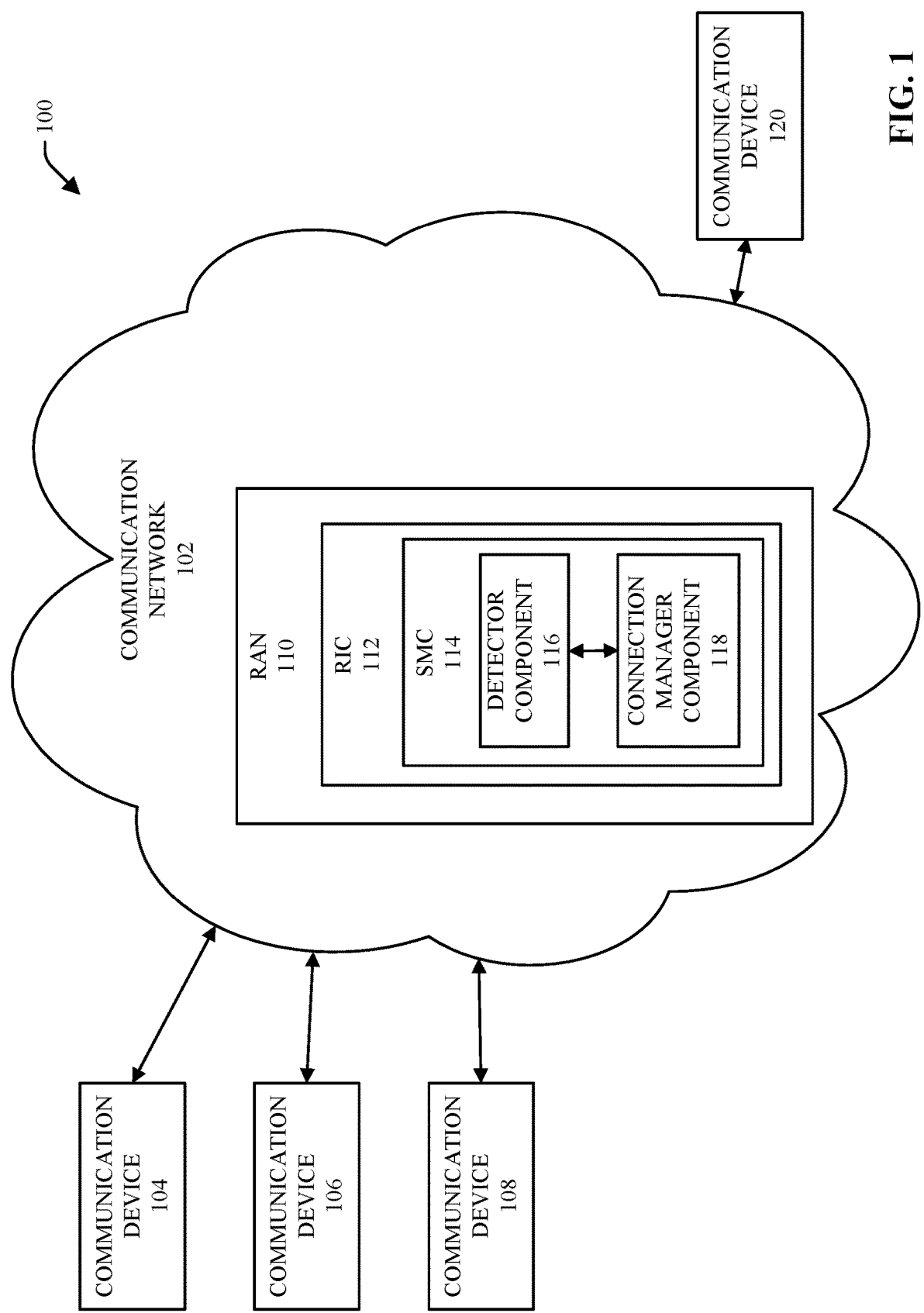
FIG. 1 illustrates a block diagram of an example system that can detect and mitigate malicious events against a radio access network (RAN) of a communication network and can manage connection of communication devices to the RAN, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Discussed herein are various aspects that relate to detecting and mitigating malicious events, such as, for example, distributed denial of service (DDoS) attacks (also referred to herein as signaling storms), against a communication network (e.g., wireless communication network) using machine learning techniques and algorithms, and, when a malicious event is detected, identifying and distinguishing between critical (e.g., emergency, high priority, or mission critical)

communications and non-critical communications with regard to attempted connections of devices to the communication network, using the machine learning techniques and algorithms, and controlling connections to allow connections of devices associated with critical communications to the communication network and deny connections of devices associated with non-critical communications to the communication network. The disclosed subject matter can enhance detection and mitigation of malicious events against the communication network, enable critical communications to be communicated via the communication network without disruption, enhance the user experience with regard to communications via the communication network, enhance security of the communication network, and enhance network efficiency of the communication network.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 2G, 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/HSPA, Global System for Mobile Communications (GSM)/GSM EDGE Radio Access Network (GERAN), Wi Fi, Wireless Local Area Network (WLAN), WiMax, CDMA2000, and so on).

As used herein, "5G" can also be referred to as New Radio (NR) access. Accordingly, systems, methods, and/or machine-readable storage media for reducing interference on reference signals from other co-channel reference signals, and improving the channel estimation performance for CSI estimation and data detection, in 5G systems, and other next generation systems, can be desired. As used herein, one or more aspects of a 5G network can comprise, but is not limited to, data rates of several tens of megabits per second (Mbps) supported for tens of thousands of users; at least one gigabit per second (Gbps) that can be offered simultaneously to tens of users (e.g., tens of workers on the same office floor); several hundreds of thousands of simultaneous connections supported for massive sensor deployments; spectral efficiency that can be significantly enhanced compared to 4G; improvement in coverage relative to 4G; signaling efficiency that can be enhanced compared to 4G; and/or latency that can be significantly reduced compared to LTE.

Multiple Input, Multiple Output (MIMO) technology can be employed in communication networks, wherein MIMO technology can be an advanced antenna technique utilized to improve spectral efficiency and, thereby, boost overall system capacity. Spectral efficiency (also referred to as spectrum efficiency or bandwidth efficiency) refers to an information rate that can be transmitted over a given bandwidth in a communication system.

For MIMO, a notation (M×N) can be utilized to represent the MIMO configuration in terms of a number of transmit antennas (M) and a number of receive antennas (N) on one end of the transmission system. Examples of MIMO configurations used for various technologies can include: (2×1), (1×2), (2×2), (4×2), (8×2) and (2×4), (4×4), (8×4). The configurations represented by (2×1) and (1×2) can be special cases of MIMO known as transmit and receive diversity.

In some cases, MIMO systems can significantly increase the data carrying capacity of wireless communications systems. Further, MIMO can be used for achieving diversity gain, which refers to an increase in signal-to-interference ratio due to a diversity scheme and, thus, can represent how much the transmission power can be reduced when the diversity scheme is introduced, without a corresponding performance loss. MIMO also can be used to achieve spatial multiplexing gain, which can be realized when a communications system is transmitting different streams of data from the same radio resource in separate spatial dimensions (e.g., data is sent/received over multiple channels, linked to different pilot frequencies, over multiple antennas). Spatial multiplexing gain can result in capacity gain without the need for additional power or bandwidth. In addition, MIMO can be utilized to realize beamforming gain. Due to the benefits achieved, MIMO can be an integral part of the third generation wireless system and the fourth generation wireless system. In addition, 5G systems also will employ massive MIMO systems (e.g., hundreds of antennas at the transmitter side and receiver side). Typically, with a $(N_t, N_r)$, where $N_t$ denotes the number of transmit antennas and $N_r$ denotes the number of receive antennas, the peak data rate can be a multiple with a factor of $N_t$ over single antenna systems in a rich scattering environment.

Communication devices can communicate information (e.g., voice and/or data traffic) to other communication devices via a communication network, which can comprise a core network that can operate to enable wireless communication between communication devices. For example, a wireless communication device (e.g., mobile, cell, or smart phone; electronic tablet or pad; computer; . . . ) can connect to and communicate with a wireless communication network (e.g., core network) to communicate with another communication device connected to the wireless communication network or to another communication network (e.g., Internet Protocol (IP)-based network, such as the Internet) associated with (e.g., communicatively connected to) the wireless communication network.

Communication devices can operate and communicate via wireless or wireline communication connections (e.g., communication links or channels) in a communication network to perform desired transfers of data (e.g., voice and/or data communications), utilize services, engage in transactions or other interactions, and/or perform other operations. In addition to wireless phones, electronic pads or tablets, and computers being used and connected to the communication network, increasingly Internet of Things (IoT) devices are being used and connected to the communication network.

The number of IoT devices being employed is expected to increase exponentially into the tens of billions of IoT devices, which has been referred to as massive IoT. Massive IoT can be one of the key service drivers for 5G and other next generation communication networks.

Many IoT devices can have security vulnerabilities, such as Zero Day vulnerabilities, such as security holes in the software of the IoT devices that can be unknown to the vendor and can be exploited by malicious users (e.g., hackers or criminals). Malicious users can exploit such vulnerabilities in IoT devices, for example, to create botnet armies by infecting IoT devices with stealthy malware (e.g., by surreptitiously installing stealthy malware on IoT devices). This security threat can be expected to increase in magnitude due to the "massive" factor in massive IoT.

One of the main goals of these botnet armies of infected IoT devices can be to disrupt communication services, including mission critical 5G and other next generation services, of a communication network by means of DDoS attacks, which also are known as signaling storms. Since 5G and other next generation communication networks will facilitate massive IoT accessing the 5G and other next generation radio access network (RAN), this can increase the risk of RAN resource (e.g., 5G or other next generation RAN resource) overload by means of DDoS attacks disrupting services, including mission critical 5G and other next generation services, of the communication network.

To that end, techniques for managing communication connections of devices to a communication network, including detecting and mitigating malicious events (e.g., malicious attacks) by certain communication devices (e.g., malicious devices) against a RAN, while managing communication connections of communication devices communicating priority messages (e.g., emergency messages, mission critical messages, or other type of high priority messages) to allow communication connections of the communication devices communicating such priority messages, are presented. The disclosed subject matter can comprise a security management component (SMC) that can employ a detector component that can determine whether a malicious event (e.g., malicious attack) against the RAN by certain communication devices is occurring based at least in part on a defined baseline that can indicate whether a malicious event against the RAN is occurring. The SMC can be part of or associated with the RAN (e.g., the SMC can be part of a RAN intelligent controller (MC) of the RAN). In some embodiments, the SMC can comprise a machine learning component that can employ machine learning techniques, functions, and algorithms to perform analysis (e.g., machine learning analysis) on information associated with communication devices to facilitate enhancing detection of malicious events against the RAN, enhancing the defined baseline, enhancing connection management determinations associated with the RAN, and/or other enhancements associated with the RAN, as more fully described herein.

When communication devices communicate attach requests (e.g., initial attach request; or an update attach request, such as an authentication update request) or other types of communications to the RAN to request connection to the RAN, requests updates in connection with a connection to the RAN, or for other reasons, the SMC can receive information comprising or relating to such attach requests or other types of communications. The SMC, employing a parser component and a filter component, can analyze the information comprising or relating to such attach requests or other types of communications. Based at least in part on the analysis, the parser component can parse the information and, from the parsed information, the filter component can determine which items of information are relevant. The filter component can filter (e.g., intelligently filter) the parsed information to generate filtered information, comprising the relevant information, and can purge the undesired information (e.g., information determined to not be sufficiently relevant). The filtered information (e.g., filtered information comprising or relating to such attach requests or other types of communications) can be provided to the detector component.

The detector component can analyze the filtered information. Based at least in part on the results of analyzing the filtered information, the detector component can determine respective characteristics associated with respective communication devices, respective groups of communication devices, or respective messages associated with the respective communication devices. The respective characteristics associated with the respective devices, respective groups of communication devices, or the respective messages can comprise, for example, a type of communication device, a device identifier associated with the communication device, a location of a communication device, a number of communication devices located within a defined area and/or located in relative proximity (e.g., within a defined distance) of each other, a type of request or communication, a priority level associated with a communication device or associated communication (e.g., message), a time (e.g., time of day, day of week, or time of year, . . . ) associated with the attach request or other communication received from a communication device, or other desired characteristics.

As part of the analysis of the filtered information, the detector component can utilize (e.g., apply) the defined baseline with respect to the respective characteristics (e.g., respective parameters associated with the respective characteristics) associated with the respective devices, respective groups of communication devices, or the respective messages to facilitate determining whether the defined baseline has been satisfied (e.g., met or exceeded; or breached), which can indicate that a malicious event against the RAN by at least some communication devices can be occurring (e.g., can at least be a preliminary indication that the malicious event against the RAN is occurring). For instance, the defined baseline can comprise respective threshold parameters values associated with respective baseline parameters relating to the respective characteristics. The detector component can determine whether one or more of the respective threshold parameter values are satisfied (e.g., met or exceeded; or breached) to facilitate determining whether the defined baseline has been satisfied, in accordance with the defined network security criteria.

In some embodiments, in response to a preliminary (e.g., an initial) determination by the SMC that there is a malicious event by certain communication devices against the RAN occurring based at least in part on the defined baseline, the SMC can determine whether the preliminary determination that there is a malicious event by certain communication devices against the RAN occurring is an actual malicious event or is instead a false positive indication of a malicious event against the RAN occurring, based at least in part on a subsequent analysis (e.g., a deeper or more detailed analysis) of the respective characteristics associated with the respective communication devices or group of communication devices, or the associated messages, and feedback information (e.g., update information) relating to false positive determinations of malicious events against the RAN that can be received from the machine learning component, as more fully described herein.

If the SMC (e.g., the detector component of the SMC) determines that no malicious event by communication devices against the RAN is occurring (either from a preliminary determination or from a subsequent determination that the preliminary determination of a malicious event against the RAN was a false positive), the SMC can determine that no mitigation action (e.g., malicious event mitigation action) has to be taken with respect to the communication devices attempting to connect to the RAN or requesting other services or resources from the RAN. Accordingly, the SMC can allow those communication devices, which are attempting to connect to the RAN, to connect to the RAN to communicate with other communication devices associated with the communication network, and, with regard to communication devices that are requesting other services or resources from the RAN, the SMC can allow the RAN to process such requests and provide the other services or resources to those communication devices.

If, instead, the SMC (e.g., employing the detector component) determines that a malicious event by certain communication devices against the RAN is occurring (and determines that such malicious event determination is not a false positive), the SMC, employing a connection manager component, can determine that mitigation action is to be taken to mitigate the effects (e.g., negative effects) of the malicious event. For instance, in response to the detector component determining that a malicious event by certain communication devices against the RAN is occurring, the connection manager component can determine whether to disallow connections (e.g., block connections or discontinue previously established connections) of at least some of the communication devices to the RAN based at least in part on respective priority levels (e.g., priority or criticality levels) associated with the respective communication devices or associated messages being communicated by the respective communication devices. For example, the connection manager component can block connections of those communication devices attempting to connect to the RAN to communicate messages associated with a priority level(s) (e.g., lower priority level or non-critical level) that does not satisfy a defined threshold priority level, wherein the defined threshold priority level can indicate whether a message (or associated communication device or associated service) has a sufficiently high priority level to allow the communication device to connect to or remain connected to the RAN and communicate the message. Examples of messages (or associated communication devices or associated services) that can have a sufficiently high priority level can include emergency messages (e.g., law enforcement, medical, 911, or other type of emergency messages), mission critical messages (e.g., mission critical message associated with a mission critical service), or other types of high priority messages. In response to determining that a message(s) (or associated communication device(s) or service(s)) is associated with a priority level that satisfies (e.g., meets or exceeds) the defined threshold priority level, the connection manager component can determine that the communication device(s) can connect to or remain connected to the RAN to communicate the message(s).

These and other aspects and embodiments of the disclosed subject matter will now be described with respect to the drawings.

Referring now to the drawings, FIG. 1 illustrates a block diagram of an example system 100 that can detect and mitigate malicious events against a radio access network (RAN) of a communication network and can manage connection of communication devices to the RAN, in accordance with various aspects and embodiments of the disclosed subject matter. The system 100 can comprise a communication network 102 can comprise a mobility core network (e.g., a wireless communication network) and/or a packet data network (e.g., an Internet Protocol (IP)-based network, such as the Internet and/or intranet) that can be associated with the mobility core network.

The mobility core network of the communication network 102 can operate to enable wireless communication between communication devices and/or between a communication device and the communication network 102. The communication network 102 can comprise various components, such as network (NW) nodes, e.g., radio network nodes) that can be part of the communication network 102 to facilitate communication of information between devices (e.g., communication devices) that can be associated with (e.g., communicatively connected to) the communication network 102. In some embodiments, the communication network 102 can employ MIMO technology to facilitate data communications between devices (e.g., network devices, communication devices, . . . ) associated with the communication network 102.

As used herein, the terms "network node," "network node component," and "network component" can be interchangeable with (or include) a network, a network controller, or any number of other network components. Further, as utilized herein, the non-limiting term radio network node, or network node can be used herein to refer to any type of network node serving communications devices and/or connected to other network nodes, network elements, or another network node from which the communications devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes also can comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Network nodes can be, for example, Node B devices, base station (BS) devices, access point (AP) devices, TRPs, and radio access network (RAN) devices. Other examples of network nodes can include multi-standard radio (MSR) nodes, comprising: an MSR BS, a gNodeB, an eNodeB, a network controller, a radio network controller (RNC), a base station controller (BSC), a relay, a donor node controlling relay, a BTS, an AP, a transmission point, a transmission node, a Remote Radio Unit (RRU), a Remote Radio Head (RRH), nodes in distributed antenna system (DAS), and the like. In accordance with various embodiments, a network node can be, can comprise, or can be associated with (e.g., communicatively connected to) a network device of the communication network 102.

At given times, one or more communication devices, such as, for example, communication device 104, communication device 106, and communication device 108, can connect or attempt to connect to the communication network 102 to communicate with other communication devices associated with the communication network 102. A communication device (e.g., 104, 106, or 108, . . . ) also can be referred to as, for example, a device, a mobile device, or a mobile communication device. The term communication device can be interchangeable with (or include) a UE or other terminology. A communication device (or UE, device, . . . ) can refer to any type of wireless device that can communicate with a radio network node in a cellular or mobile communication system. Examples of communication devices can include, but are not limited to, a device to device (D2D) UE, a machine type UE or a UE capable of machine to machine (M2M) communication, a Personal Digital Assistant (PDA), a tablet or pad (e.g., an electronic tablet or pad), an electronic notebook, a mobile terminal, a cellular and/or smart phone, a computer (e.g., a laptop embedded equipment (LEE), a laptop mounted equipment (LME), or other type of computer), a smart meter (e.g., a smart utility meter), a target device, devices and/or sensors that can monitor or sense conditions (e.g., health-related devices or sensors, such as heart monitors, blood pressure monitors, blood sugar monitors, health emergency detection and/or notification devices, . . . ), a broadband communication device (e.g., a wireless, mobile, and/or residential broadband communication device, transceiver, gateway, and/or router), a dongle (e.g., a Universal Serial Bus (USB) dongle), an electronic gaming device, electronic eyeglasses, headwear, or bodywear (e.g., electronic or smart eyeglasses, headwear (e.g., augmented reality (AR) or virtual reality (VR) headset), or bodywear (e.g., electronic or smart watch) having wireless communication functionality), a music or media player, speakers (e.g., powered speakers having wireless communication functionality), an appliance (e.g., a toaster, a coffee maker, a refrigerator, or an oven, . . . , having wireless communication functionality), a set-top box, an IP television (IPTV), a device associated or integrated with a vehicle (e.g., automobile, airplane, bus, train, or ship, . . . ), a virtual assistant (VA) device, a drone, a home or building automation device (e.g., security device, climate control device, lighting control device, . . . ), an industrial or manufacturing related device, a farming or livestock ranch related device, and/or any other type of communication devices (e.g., other types of IoTs).

It is noted that the various aspects of the disclosed subject matter described herein can be applicable to single carrier as well as to multicarrier (MC) or carrier aggregation (CA) operation of the communication device. The term carrier aggregation (CA) also can be referred to (e.g., interchangeably called) "multi-carrier system," "multi-cell operation," "multi-carrier operation," "multi-carrier" transmission and/or reception. In addition, the various aspects discussed can be applied for Multi RAB (radio bearers) on some carriers (e.g., data plus speech can be simultaneously scheduled).

It is to be appreciated and understood that the terms element (e.g., element in connection with an antenna), elements, and antenna ports also can be used interchangeably, but can carry the same meaning, in this subject disclosure. In some embodiments, more than a single antenna element can be mapped to a single antenna port.

As disclosed, the mobility core network of the communication network 102 can comprise various network components or devices, which can include one or more RANs, such as, for example, RAN 110, wherein each RAN can comprise or be associated with a set of base stations (e.g., access points (APs)) (not shown) that can serve communication devices located in respective coverage areas served by respective base stations in the mobility core network of the communication network 102. The respective base stations can be associated with one or more sectors (not shown), wherein respective sectors can comprise respective cells. The cells can have respective coverage areas that can form the coverage area covered by the one or more sectors. The respective communication devices can be communicatively connected to the communication network 102 via respective wireless or wireline communication connections with one or more of the respective cells.

In some embodiments, the one or more RANs (e.g., RAN 110) can be an open-RAN (O-RAN) that can employ an open interface that can support interoperability of devices (e.g., network devices) from different entities (e.g., vendors). The O-RAN can build or establish wireless connections through virtualization. In certain embodiments, the O-RAN can utilize a common platform that can reduce reliance on proprietary platforms of service providers. The O-RAN also can employ standardized interfaces and application programming interfaces (APIs) to facilitate open source implementation of the O-RAN.

The number of communication devices, particularly IoT devices, being utilized is increasing at a significant rate and can be expected to continue to increase significantly into the future (e.g., increase to tens of billions of devices). While in most instances, the communication devices (e.g., 104, 106, or 108, . . . ) and associated users can be attempting to connect to the RAN 110 for appropriate or benign reasons, in some instances, malicious actors can utilize communication devices to attempt to connect to the RAN 110 to disrupt (e.g., obstruct or interrupt) services, such as mobility services, provided by the communication network 102, including the RAN 110. For example, malicious actors can utilize communication devices (e.g., 104 or 106, . . . ), such as IoT devices, and exploit vulnerabilities of such devices (e.g., by installing malware on such communication devices) to initiate a malicious event, such as a DDoS attack, against the RAN 110 to overwhelm the RAN 110 and disrupt the services provided by the RAN 110 and/or associated communication network 102, including disrupting communication between communication devices (e.g., non-malicious acting communication devices) connected to or attempting to connect to the RAN 110 and/or associated communication network 102, as more fully described herein. The disclosed subject matter can determine (e.g., intelligently, automatically, and/or dynamically) determine when malicious events against the RAN 110 by certain (e.g., malicious and/or malware infected) communication devices is occurring (e.g., in real time or substantially in real time), as more fully described herein.

In some cases, there can be communication devices that are attempting to connect to the RAN 110 to communicate priority (e.g., high priority or critical) messages, via the RAN 110, to other communication devices associated with the communication network 102. If there is a malicious event against the RAN 110 detected, the malicious event, if not mitigated, can disrupt services of the RAN 110 to prevent a communication device attempting to connect and communicate a priority message via the RAN 110, and/or, if all communication devices attempting to connect to the RAN 110 during a malicious event were to be blocked from connecting, that can undesirably (e.g., negatively) impact the ability of those communication devices that are attempting to connect to the RAN 110 to communicate priority messages from doing so. The disclosed subject matter can desirably (e.g., intelligently, automatically, and/or dynamically in real time or substantially in real time) determine which communication devices are associated with a higher priority level, allow connection of communication devices associated with the higher priority level to the RAN 110, and block connection of communication devices (e.g., including malicious acting communication devices) that are associated with a relatively lower priority levels, as more fully described herein.

To that end, in some embodiments, the RAN 110 can comprise a RAN intelligent controller (MC) 112 that can manage various functions and resources of or associated with the RAN 110 in real time or substantially close (e.g., near) to real time. To facilitate securing the RAN 110 and communication network 102 overall from malicious events (e.g., malicious attacks, such as DDoS attacks), the MC 112 can comprise a security management component (SMC) 114 that can detect and mitigate malicious events against the RAN 110 and can manage connection of communication devices (e.g., 104, 106, or 108, . . . ) to the RAN 110 (e.g., manage connection of communication devices during malicious events), in accordance with defined network security criteria. In some embodiments, the SMC 114 can employ a security application (e.g., malicious event and/or DDoS application) to facilitate detecting and mitigating malicious events against the RAN 110, and managing (e.g., controlling) connections of communication devices to the RAN 110. For example, the security application can be a micro services application (e.g., xApp).

Communication devices (e.g., 104, 106, or 108, . . . ) can communicate attach requests or other types of communications to the RAN 110 to facilitate obtaining services or resources from the RAN 110. For instance, a communication device (e.g., communication device 104) can communicate an initial attach request to the RAN 110 to request connection to the RAN 110, or a communication device can communicate another type of attach request (e.g., update request, such as an authentication update request, or a packet data network (PDN) gateway (PGW) update request, . . . ) to the RAN 110 to request another type of service or resources from the RAN 110.

When communication devices (e.g., 104, 106, or 108, . . . ) communicate attach requests or other types of communications to the RAN 110, the SMC 114 can receive information comprising or relating to such attach requests or other types of communications. The RAN 110 and the SMC 114 can receive the information contained in an attach request or other type of communication from the communication device (e.g., communication device 104) and/or can receive other information (e.g., other attach request-related information) from the communication device or network devices of the communication network 102. For instance, the SMC 114 (and/or the RAN 110) can receive device identifier information (e.g., international mobile equipment identity (IMEI) number or other unique device identifier or serial number) that can identify the communication device, device location information that can identify the location of the communication device, device type information that can identify the type of device the communication device is, priority information that can indicate or specify a priority level associated with the communication device or message associated with the communication device, time data (e.g., time stamp data) that can indicate the time of the attach request or type of communication or time(s) associated with another item(s) of attach request-related information, metadata associated with the attach request and/or communication device, and/or other type of attach request-related information.

With regard to each attach request (e.g., initial attach request or update request) or other type of communication received from a communication device (e.g., 104, 106, or 108, . . . ), the SMC 114 (e.g., employing a parser component and a filter component, as more fully described herein) can analyze the information comprising or relating to such attach request or other type of communication. Based at least in part on the results of the analysis, the SMC 114 can parse such information to determine respective data elements (e.g., device identifier, device type, type of request or communication, time data, and/or location data, . . . ) in and from such information and generate parsed information comprising the respective data elements. From the parsed information, the SMC 114 can determine which items of information (e.g., which data elements) are relevant to determining whether a malicious event against the RAN 110 is occurring, determining a priority level associated with the communication device or associated message, determining whether to allow a communication device to connect or remain connected to the RAN 110, or performing other functions or operations. The SMC 114 (e.g., employing the filter component) can filter (e.g., intelligently filter) the parsed information to generate filtered information, comprising the relevant information, and can purge the undesired information (e.g., information determined to not be sufficiently relevant).

In some embodiments, the SMC 114 can comprise a detector component 116 that can receive and analyze the filtered information, wherein the filtered information can comprise respective filtered information relating to respective communication devices (e.g., 104, 106, and/or 108, . . . ), and associated attach requests or other communications, in connection with the communication devices attempting to connect to the RAN 110, requesting an update with regard to a connection (e.g., previously established connection) to the RAN 110, or communicating with the RAN 110 for any other reason. Based at least in part on the results of analyzing the respective filtered information associated with respective communication devices, the detector component 116 can determine respective characteristics associated with respective communication devices (e.g., 104, 106, or 108, . . . ), respective groups of communication devices, or respective messages associated with the respective communication devices. The respective characteristics associated with the respective communication devices (e.g., 104, 106, or 108, . . . ), respective groups of communication devices, or the respective messages can comprise, for example, a type of communication device (e.g., mobile phone, a smart speaker (e.g., a VA device), or a medical device, . . . ), a device identifier (e.g., IMEI) associated with the communication device, a location of a communication device, a number of communication devices located within a defined area and/or located in relative proximity (e.g., within a defined distance) of each other, a type of request or communication, a priority level associated with a communication device or associated communication (e.g., message), a time (e.g., time of day, day of week, or time of year,) associated with the attach request or other communication received from a communication device or associated with an item of information (e.g., an item of relevant information), or other desired characteristics.

As part of the analysis of the filtered information, the detector component 116 can utilize (e.g., apply) a defined baseline (e.g., an initial baseline or updated baseline, as applicable) with respect to the respective characteristics (e.g., respective parameters associated with the respective characteristics) associated with the respective communication devices (e.g., 104, 106, or 108, . . . ), respective groups of communication devices, or the respective messages to facilitate determining whether the defined baseline has been satisfied (e.g., met or exceeded; or breached). The defined baseline can indicate or specify one or more conditions that, when met (e.g., satisfied or breached), can indicate that there is, or at least may be, a malicious event against the RAN 110 occurring. If the detector component 116 determines that the defined baseline has been satisfied, it can indicate that a malicious event against the RAN 110 by at least some communication devices (e.g., 104 and/or 106) can be occurring (e.g., it can be at least a preliminary indication that a malicious event against the RAN 110 is occurring). For instance, the defined baseline can comprise respective threshold parameters values associated with respective baseline parameters relating to the respective characteristics. Based at least in part on the results of analyzing the respective characteristics associated with the respective communication devices in relation to the defined baseline, the detector component 116 can determine whether one or more of the respective threshold parameter values are satisfied (e.g., met or exceeded; or breached) with respect to one or more of the respective baseline parameters relating to one or more respective characteristics to facilitate determining whether the defined baseline has been satisfied, in accordance with the defined network security criteria. That is, the detector component 116 can determine whether a set of conditions associated with the respective conditions have been met to indicate that the defined baseline has been satisfied, and thus, indicate that there is, or at least may be, a malicious event against the RAN 110 by at least some of the communication devices occurring.

For example, based at least in part on the results of analyzing the respective characteristics associated with the respective communication devices (e.g., 104, 106, 108, . . . ), the detector component 116 determines that, during a defined amount of time (e.g., a relatively short amount of time), there is a number of communication devices that are located within a defined area or within a defined distance of each other, and have sent attach requests (e.g., initial attach requests or update requests) to the RAN 110, and determines that such number of communication devices meets or exceeds a defined threshold number of communication devices with regard to sending of attach requests (e.g., within the defined amount of time, by communication devices located within the defined area or within the defined distance of each other). The defined threshold number of communication devices, the defined amount of time, the defined area, and/or the defined distance can be part of the baseline parameters and parameter values of the defined baseline. Based at least in part on determining that such number of communication devices meets or exceeds the defined threshold number of communication devices with regard to sending of attach requests, the detector component 116 can determine that the defined baseline for determining a malicious event against the RAN 110 has been satisfied (e.g., breached), and, accordingly, can determine that a malicious event against the RAN 110 by at least some communication devices is or at least may be occurring. Additionally or alternatively, the detector component 116 can take into account (e.g., can evaluate) the number of communication devices of a particular type or manufacturer (e.g., a device type, such as, for example, a smart speaker, a medical device, a mobile phone, or a smart meter; a particular model of device; and/or a particular device manufacturer; . . . ) in relation to an applicable threshold number of communication devices when determining whether a malicious event against the RAN 110 is occurring.

It is to be appreciated and understood that this is but one example, and, in accordance with other example aspects and embodiments, when in accordance with the defined network security criteria (e.g., applicable defined network security criteria), and/or based at least in part on the analysis results, the detector component 116 can or may determine that one or more other conditions (e.g., breaching of one or more other threshold parameter values associated with one or more other baseline parameters) of the defined baseline are to be satisfied before reaching a decision that the defined baseline has been breached, can or may determine that alternative conditions associated with the defined baseline are indicative of whether a malicious event against the RAN 110 is occurring, and/or can or may determine that another condition(s) associated with the defined baseline indicates that a malicious event against the RAN 110 is not occurring.

With regard to attach requests, it is to be appreciated and understood that a malicious attack against the RAN 110 by certain communication devices can involve initial attach requests, or can involve another type of attach requests (e.g., an attach update request), or can involve a hybrid malicious attack where different communication devices are communicating different types of attach requests (e.g., some devices are sending initial attach requests to the RAN 110, and other devices are sending another type(s) of attach request to the RAN 110) in order to attack (e.g., DDoS attack) and disrupt operation of the RAN 110. The detector component 116 can take all of this into account when making determinations regarding whether or not a malicious event against the RAN 110 by at least some communication devices is occurring, and, as a result, can determine whether such a malicious event against the RAN 110 is occurring regardless of whether the malicious acting communication devices are respectively sending initial attach requests, other types of attach requests, or both initial attach requests and other types of attach requests.

In certain embodiments, in response to a preliminary (e.g., an initial) determination by the detector component 116 that there is a malicious event by certain communication devices (e.g., 104 and/or 106) against the RAN 110 occurring based at least in part on the defined baseline, the detector component 116 (e.g., employing a false positive checker component, as more fully described herein) can determine whether the preliminary determination that there is a malicious event by certain communication devices against the RAN 110 occurring is an actual malicious event against the RAN 110 or is instead a false positive indication of a malicious event against the RAN 110 occurring, based at least in part on a subsequent analysis (e.g., a different, deeper, and/or more detailed analysis) of the respective characteristics associated with the respective communication devices or group of communication devices, or the associated messages, and feedback information (e.g., update information) relating to false positive determinations of malicious events against the RAN 110 that can be received from a machine learning component (not shown in FIG. 1) of the SMC 114, as more fully described herein. For example, the false positive checker component of the detector component 116 can utilize different or updated indicators and/or threshold parameter values that can indicate whether a preliminary determination of a malicious event against the RAN 110 is a false positive or not.

If the detector component 116 determines that no malicious event by communication devices against the RAN 110 is occurring (either from a preliminary determination, or from a subsequent determination that the preliminary determination of a malicious event against the RAN 110 was a false positive), the SMC 114 can determine that no mitigation action (e.g., malicious event mitigation action) has to be taken with respect to the communication devices (e.g., 104, 106, or 108, . . . ) attempting to connect to the RAN or requesting other services or resources from the RAN. As a result, the SMC 114 can allow those communication devices, which are attempting to connect to the RAN 110, to connect to the RAN 110 to communicate with other communication devices associated with the communication network 102, and, with regard to communication devices that are requesting other services or resources from the RAN 110, the SMC 114 can allow the RAN 110 to process such requests and provide the other services or resources to those communication devices. Accordingly, the RAN 110 can service the attach requests or other requests associated with the communication devices to allow communication devices to connect to the RAN 110 or allow communication devices to maintain a connection with the RAN 110.

If, instead, the detector component 116 determines that a malicious event by at least some communication devices against the RAN 110 is occurring (and determines that such malicious event determination is not a false positive), the SMC 114, employing a connection manager component 118, can determine that mitigation action is to be taken to mitigate the effects (e.g., negative effects) of the malicious event against the RAN 110. For example, in response to the detector component 116 determining that a malicious event by at least some communication devices against the RAN 110 is occurring, the detector component 116 can communicate information (e.g., malicious event information), which can indicate that there is such malicious event occurring, to the connection manager component 118. The detector component 116 or other component (e.g., filter component) of the SMC 114 also can communicate other information, including all or a desired portion of the filtered information (e.g., relevant information), to the connection manager component 118.

The connection manager component 118 can analyze the information relating to the detection of the malicious event and the other information (e.g., the filtered and/or relevant information). Based at least in part on the results of such analysis, the connection manager component 118 can determine respective priority levels (e.g., priority or criticality levels) associated with the respective communication devices (e.g., 104, 106, or 108, . . . ) or associated messages being communicated by or with respect to (e.g., or to be received by) the respective communication devices. With regard to each communication device, the connection manager component 118 can compare the priority level associated with a communication device to a defined threshold priority level to facilitate determining whether the priority level satisfies (e.g., meets or exceeds) the defined threshold priority level, wherein the defined threshold priority level can be determined by the SMC 114, in accordance with the defined network security criteria. The defined threshold priority level can indicate whether a message (or associated communication device or associated service) has a sufficiently high priority level to allow the communication device to connect to or remain connected to the RAN 110 and communicate the message. Examples of messages (or associated communication devices or associated services) that can have a sufficiently high priority level can include emergency messages (e.g., law enforcement, medical, 911, or other type of emergency messages), mission critical messages (e.g., mission critical message associated with a mission critical service, such as a communication relating to the military, or a communication relating to operation of autonomous vehicles), or other types of high priority messages.

Based at least in part on respective comparison results of comparing the respective priority levels associated with the respective communication devices to the defined threshold priority level, the connection manager component 118 can determine whether to disallow connections (e.g., block connections or discontinue previously established connections) of at least some of the communication devices (e.g., 104 and 106) to the RAN 110, in accordance with the defined network security criteria. For example, to facilitate mitigating the effects of the malicious event, the connection manager component 118 can block or facilitate blocking connections of those communication devices (e.g., communication devices 104 and/or 106) attempting to connect to the RAN 110 to communicate messages associated with a priority level(s) (e.g., lower priority level or non-critical level) that does not satisfy (e.g., does not meet or exceed) the defined threshold priority level. As another example, to facilitate mitigating the effects of the malicious event, the connection manager component 118 can discontinue or facilitate discontinuing connections (e.g., remove connections) of those communication devices (e.g., communication devices 104 and/or 106) that were already connected to the RAN 110 to communicate messages associated with a priority level(s) (e.g., lower priority level or non-critical level) that does not satisfy the defined threshold priority level.

The connection manager component 118 can generate blocking and/or disconnection instructions with regard to those communication devices (e.g., communication devices 104 and/or 106) that are to be blocked from connecting to the RAN 110. The connection manager component 118 can communicate blocking and/or disconnection instructions to a desired component (e.g., a centralized unit-control plane (CU-CP)) of the RAN 110, wherein such component can implement or facilitate implementing the blocking and/or disconnection instructions to block and/or disconnect those communication devices (e.g., communication devices 104 and/or 106, with lower priority level) from connecting or remaining connected to the RAN 110.

With regard to other communication devices (e.g., communication device 108 associated with a sufficiently high priority level), in response to the connection manager component 118 determining that a message(s) (or associated communication device(s) (e.g., 108) or service(s)) is associated with a priority level (e.g., a sufficiently high priority level or criticality level) that satisfies (e.g., meets or exceeds) the defined threshold priority level, the connection manager component 118 can determine that the communication device(s) (e.g., communication device 108) can connect, or remain connected, to the RAN 110 to communicate the message(s). Accordingly, the RAN 110 can allow the communication device(s) (e.g., communication device 108) to be connected to, or to remain connected to, the RAN 110.

In some embodiments, the SMC 114 can comprise the machine learning component (not shown in FIG. 1) that can employ one or more desired machine learning techniques to enhance the parsing and/or filtering of information relating to the communication devices or associated messages, determine an initial defined baseline, enhance and update the defined baseline, enhance determinations regarding whether a malicious event by certain communication devices against a RAN is occurring, enhance determinations regarding whether a preliminary determination that a malicious event is occurring against the RAN is a false positive, and enhance determinations relating to priority levels associated with communication devices or associated messages, as more fully described herein. For instance, the machine learning component can determine the defined baseline (e.g., an initial defined baseline, and updated defined baselines thereafter) based at least in part on respective characteristics associated with respective communication devices (e.g., 104, 106, and/or 108, . . . ) or a group of communication devices and/or respective messages associated with the respective communication devices. The machine learning component can determine the respective characteristics associated with the respective devices, group of communication devices, or the respective messages based at least in part on the results of an analysis (e.g., machine learning analysis) of information (e.g., filtered or relevant information, or other desired information) relating to the respective communication devices, group of communication devices, or the respective messages.

In certain embodiments, the SMC 114 can perform post-process analytics relating to malicious event determinations, connection management determinations, and/or other operations of the SMC 114, and/or can receive information relating to post-process analytics performed by another device or component (e.g., communication device 120) to facilitate enhancing performance of the SMC 114 (and the RAN 110) with regard to making malicious event determinations, determining which communication devices can be connected to the RAN 110 during a malicious event, and/or otherwise enhancing performance of the SMC 114 (and the RAN 110), as more fully described herein. In some embodiments, the communication device 120 can perform such post-process analytics and can communicate information relating to the post-process analytics to the SMC 114.

In some embodiments, additionally or alternatively, the communication device 120 can provide the SMC 110 with additional (e.g., external) information that can or may be pertinent to making malicious event determinations, making connection management determinations, and/or performing other operations of the SMC 114. For example, there may be a particular newsworthy event (e.g., a catastrophic event, a major military action, a big finale of a television show, or a death, accident, or other significant event involving a famous person, . . . ) that is occurring, has very recently occurred, or is soon to be occurring, wherein such newsworthy event can be expected to cause more people than usual (e.g., at that time of day or day of week) to utilize their communication devices to monitor or learn more about that particular newsworthy event. The communication device 120 can communicate information relating to the particular newsworthy event to the SMC 114 to make the SMC 114 aware of the particular newsworthy event. The SMC 114 (e.g., filter component, detector component 116 (including the false positive checker component), connection manager component 118, and/or machine learning component) can analyze information relating to the particular newsworthy event, and, based at least in part on results of such analysis, can take the particular newsworthy event into account when determining whether a malicious event against the RAN 110 is occurring, determining whether a preliminary determination of a malicious event against the RAN 110 is a false positive, determining whether an unusual uptick in communication devices sending attach requests to the RAN 110 is related to the particular newsworthy event, determining whether to block communication devices from connecting or remaining connected to the RAN 110, and/or other performing other determinations or operations.

It is to be appreciated and understood that, while various aspects and embodiments of the disclosed subject matter are described herein with regard to 5G and other next generation communication networks, the techniques of the disclosed subject matter described herein can be utilized (e.g., applied to), in same or similar form, to 4G communication networks, and the disclosed subject matter includes all such aspects and embodiments relating to implementation of the techniques of the disclosed subject matter to 4G communication networks.

Other aspects and embodiments of the disclosed subject matter will be described with regard to the other figures (and/or FIG. 1).

Figure 2:
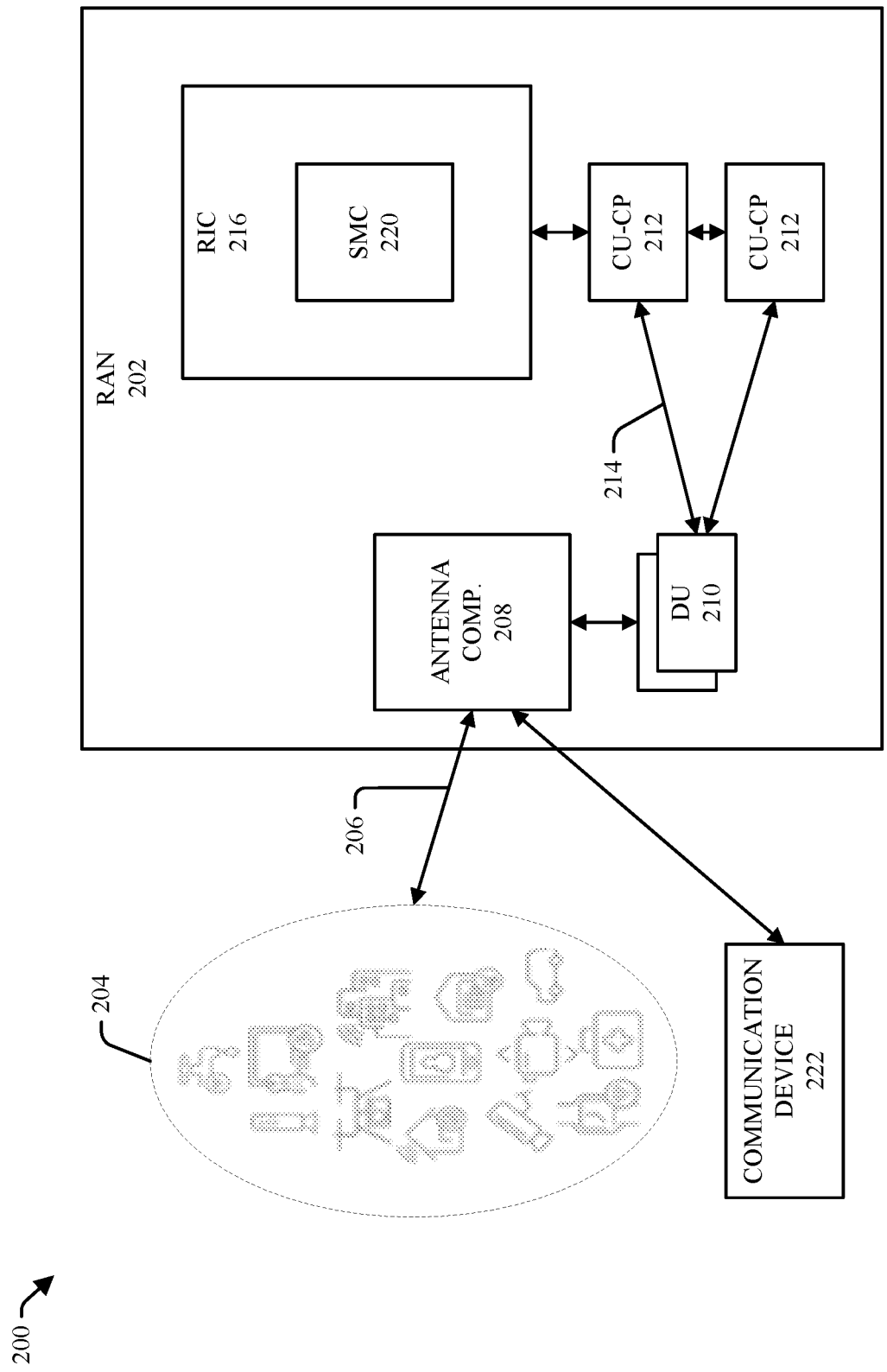
FIG. 2 depicts a diagram of an example system comprising a RAN to which communication devices, including Internet of Thing (IoT) devices, are attempting to connect, wherein the RAN comprises a security management component (SMC) that can detect and mitigate malicious events against the RAN and can manage connection of communication devices to the RAN, in accordance with various aspects and embodiments of the disclosed subject matter.

Referring to FIG. 2, FIG. 2 depicts a diagram of an example system 200 comprising a RAN to which communication devices, including IoT devices, are attempting to connect or are already connected, wherein the RAN comprises an SMC that can detect and mitigate malicious events against the RAN and can manage connection of communication devices to the RAN, in accordance with various aspects and embodiments of the disclosed subject matter. The system 200 can comprise a RAN 200 that can be part of a communication network (e.g., a mobility core network of a communication network). The RAN 202 can be the same as, or can comprise the same or similar functionality as, RANs, such as more fully described herein.

In an example instance, a plurality of communication devices 204, including IoT devices, can be attempting to connect (e.g., wirelessly connect) to the RAN 202 (or some of those devices may already be connected to the RAN 202) as part of a malicious event (e.g., malicious attack or signaling storm) by those communication devices 204 against the RAN 202. For instance, the plurality of communication devices 204 can be compromised communication devices (e.g., compromised massive IoT) that can be infected with malware. In some embodiments, each of the plurality of communication devices 204 can communicate respective attach requests or other communications to the RAN 202 via an air interface (depicted at reference numeral 206) associated with the RAN 202 to an antenna component 208 of the RAN 202. In some embodiments, the antenna component 208 can comprise a MIMO antenna array and radio unit to facilitate receiving of information by the RAN 202 and transmitting of information from the RAN 202.

The RAN 202 also can include a distributed unit (DU) component 210 that can comprise a DU function that can be associated with the radio unit and associated antenna component 208. The DU function in the 5G gNodeB/NR framework can comprise some of the functions that the base band unit (BBU) of 4G/LTE has.

The RAN 202 also can comprise a CU-CP component 212 that can employ a CU-CP function in the 5G gNodeB/NR framework. The CU-CP function can comprise certain functions (e.g., functions different from the DU function) that the BBU of 4g/LTE has. The DU component 210 can be associated with (e.g., communicatively connected to) the CU-CP component 212 via an F1-C interface 214 to facilitate data flows between the DU component 210 and the CU-CP component 212.

The RAN 202 further can comprise a RIC 216 that can be associated with (e.g., communicatively connected to) the CU-CP component 212 via an E2 interface 218, wherein the E2 interface can facilitate data flows between the CU-CP component 212 and the RIC 216. The RIC 216 can manage various functions and resources of the RAN 202 in real time or substantially close (e.g., near) to real time.

The RAN 202 can comprise an SMC 220 that can detect and mitigate malicious events by certain communication devices (e.g., plurality of communication devices 204) against the RAN 202, and desirably managing connections of communication devices to the RAN 202 during a malicious event to allow communication devices (e.g., communication device 222) associated with a higher priority to connect to the RAN 202 and block (e.g., prevent or discontinue connections of) other communication devices (including the plurality of communication devices 204) associated with a relatively lower priority from connecting to the RAN 202, in accordance with the defined network security criteria. In some embodiments, the SMC 220 can comprise and employ a security application (e.g., malicious event and/or DDoS application) to facilitate detecting and mitigating malicious events against the RAN 202, and managing connections of communication devices to the RAN 202. The security application can be a micro services application (e.g., xApp), for example. The SMC 220 can provide an intelligent security capability using machine learning to enhance the detection and mitigation of malicious threats or events against the RAN 202 caused by certain communication devices (e.g., caused by signaling storms by means of massive IoT through the plurality of communication devices 204). The SMC 220 can be the same as, or can comprise the same or similar functionality as, the SMCs, as more fully described herein.

Figure 3:
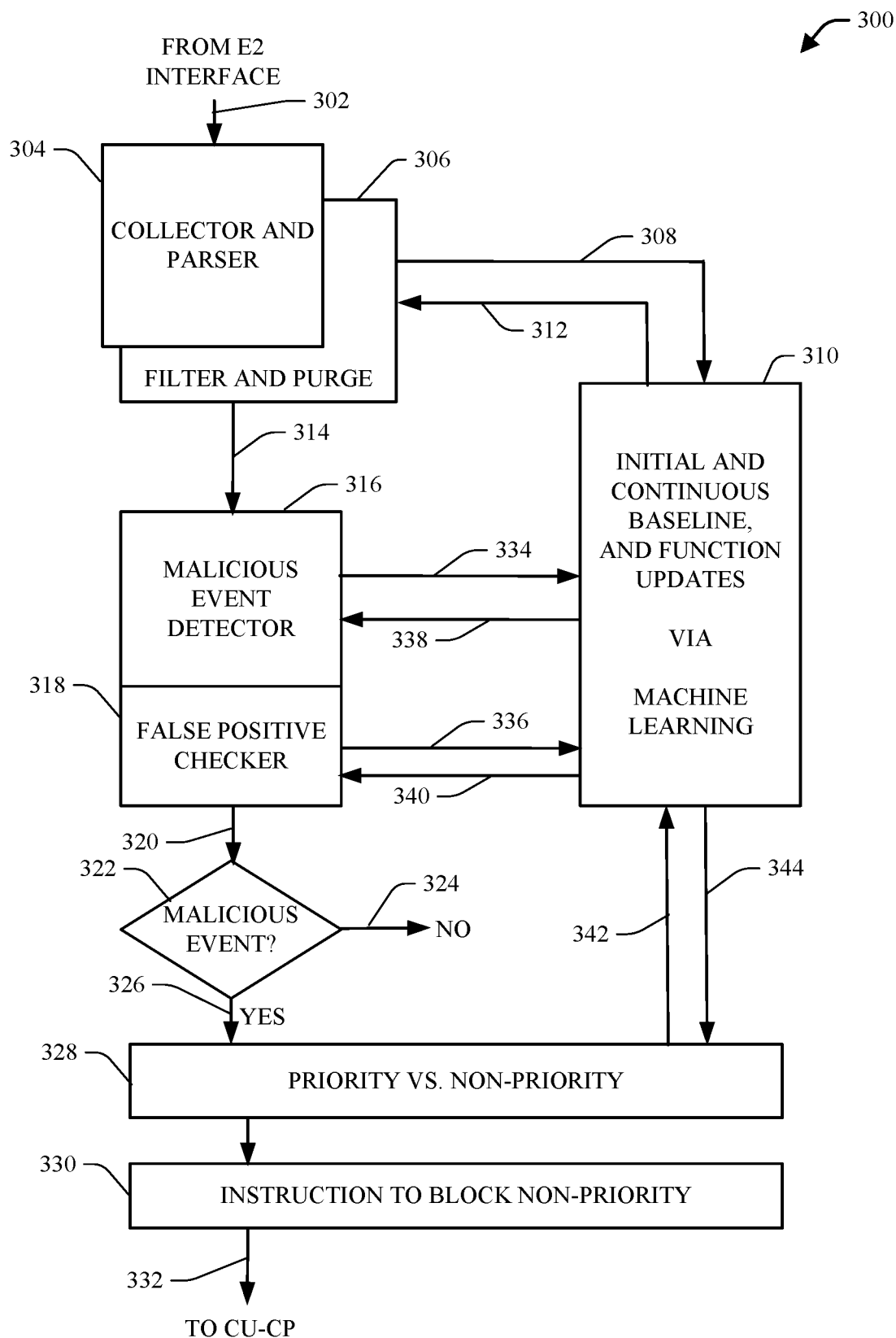
FIG. 3 depicts a block diagram of an example network security flow relating to various functions that can be performed by the SMC, in accordance with various aspects and embodiments of the disclosed subject matter.
Figure 4:
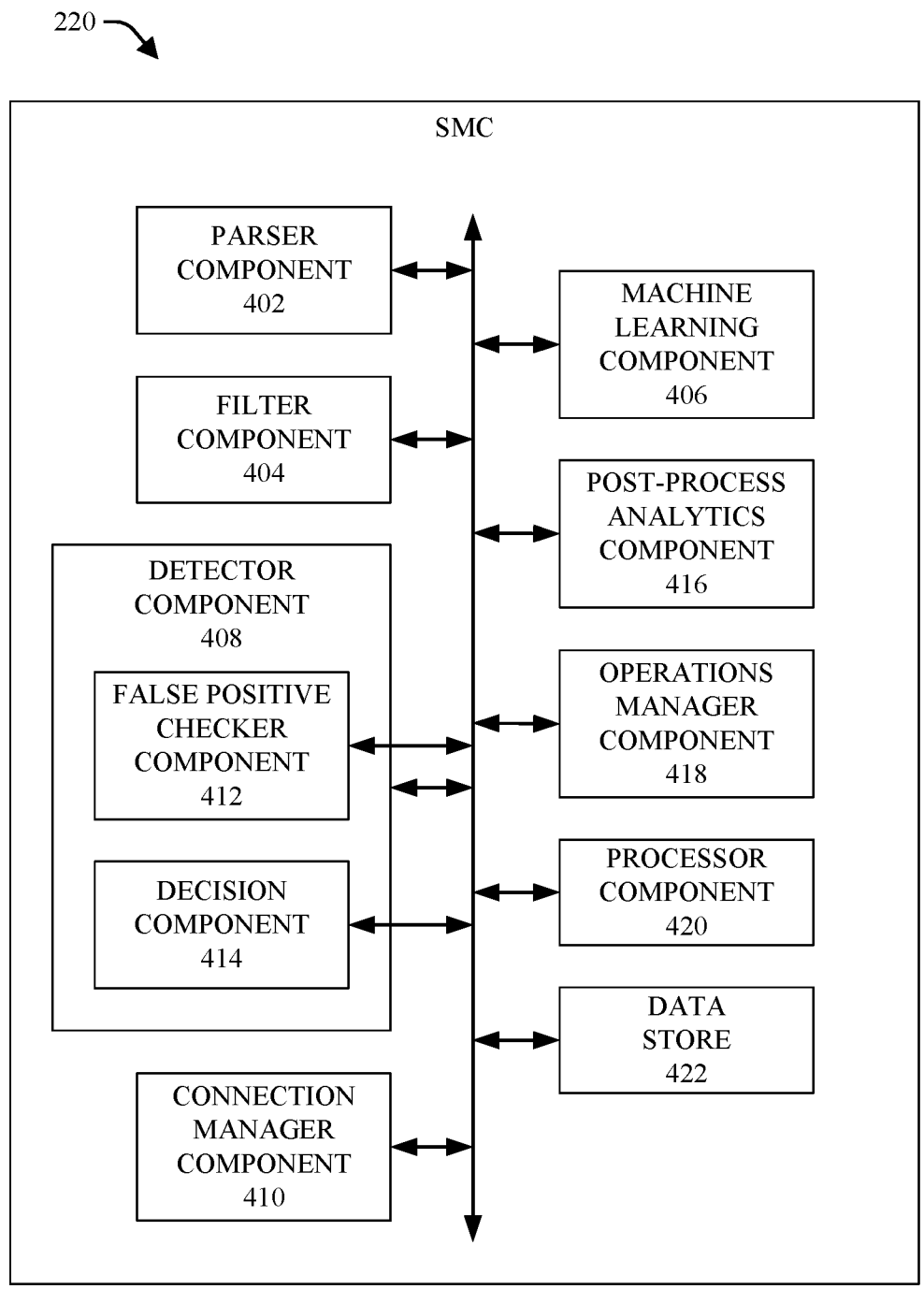
FIG. 4 depicts a block diagram of an example SMC, in accordance with various aspects and embodiments of the disclosed subject matter.

Referring to FIGS. 3 and 4 (along with FIG. 2), FIG. 3 depicts a block diagram of an example network security flow 300 relating to various functions that can be performed by the SMC 220, and FIG. 4 illustrates a block diagram of the example SMC 220, including various components of the SMC 220, in accordance with various aspects and embodiments of the disclosed subject matter. As part of the example network security flow 300, information relating to communication devices attempting to connect to, or already connected to, the RAN 202 (e.g., communication devices submitting attach requests or other communications to the RAN 202) can be received by the RIC 216, and associated SMC 220, from the CU-CP component 212 via the E2 interface 218 (as depicted at reference numeral 302 of FIG. 3). The information, which can comprise real-time RAN-related data (e.g., 5G RAN data), can include, for example, attach request information relating to attach requests, metadata, and/or other types of information relating to communication devices or associated messages, communicated to the RAN 202 by communication devices via the air interface 206 and antenna component 208. The communication devices can include, for example, communication device 222 and the plurality of communication devices 204.

The SMC 220 can comprise a parser component 402 that can collect and parse the information, including the information relating to communication devices (e.g., communication device 222 and plurality of communication devices 204) and/or associated messages, in real time or at least substantially real time (as depicted at reference numeral 304 of FIG. 3). The parser component 402 can analyze the information (e.g., attach request information, metadata, or other types of information) relating to the communication devices and/or associated messages, and based at least in part on the results of such parsing analysis, the parser component 402 can determine or identify respective items of information in the information relating to the communication devices and/or associated messages. The parser component 402 can parse such information to facilitate determining relevant information from the information relating to the communication devices and/or associated messages.

The SMC 220 also can include a filter component 404 that can be associated with (e.g., communicatively connected to) the parser component 402. The filter component 404 can filter (e.g., intelligently filter) the parsed information, can determine (e.g., intelligently determine) relevant information from the parsed information, filter the parsed information to generate filtered information comprising the relevant information, and purge the other information of the parsed information that is determined to not be sufficiently relevant (as shown at reference numeral 306 of FIG. 3.). The relevant information can comprise information determined to be relevant for use in determining whether a malicious event against the RAN 202 by certain communication devices (e.g., plurality of communication devices 204) is occurring, in accordance with the defined network security criteria (e.g., network security criteria that can indicate what types of information can be relevant to determining malicious events against the RAN 202). In some embodiments, the filter component 404 can filter the parsed information to generate the filtered information in real time or at least substantially in real time.

In certain embodiments, the filter component 404 can communicate the parsed information and/or other parsing and/or filtering-related information to a machine learning component 406 of the SMC 220 for analysis (e.g., machine learning analysis) (as indicated at reference numeral 308 of FIG. 3). The machine learning component 406 can employ machine learning techniques and algorithms to perform analysis on the parsed information and/or other parsing and/or filtering-related information to learn (e.g., continuously learn) how to improve the parsing and/or filtering (e.g., intelligent filtering) of information relating to communication devices and/or other RAN-related data to determine relevant information and facilitate detection of malicious events against the RAN 202 (as indicated at reference numeral 310). For instance, based at least in part on the results of the analysis (e.g., machine learning analysis) of the parsed information, the other parsing and/or filtering-related information, and/or historical (e.g., previous) parsed information and/or other historical parsing and/or filtering-related information, the machine learning component 406 can learn (e.g., learn in real time, and/or learn over time) what types of information can be more relevant, and what other types of information can be relatively less relevant or irrelevant, to determinations regarding whether a malicious event by communication devices (e.g., plurality of communication devices 204) is occurring.

For instance, the machine learning component 406 can employ the machine learning techniques and algorithms to learn how to enhance parsing and filtering of information relating communication devices to facilitate determining relevant information from the information relating communication devices and/or associated messages, filtering the information to generate the filtered information, comprising the relevant information, and purging undesired information (e.g., information determined to not be sufficiently relevant), in accordance with the defined network security criteria. Based at least in part on the results of such analysis and learning by the machine learning component 406, the machine learning component 406 can determine parsing and/or filtering update information (e.g., feedback information) relating to such enhancement of the parsing and filtering of the information relating communication devices and/or associated messages.

The machine learning component 406 can communicate the parsing and/or filtering update information to the parser component 402 and/or filter component 404 (as shown at reference numeral 312 of FIG. 3). The parser component 402 can utilize the parsing update information to update and enhance the parsing functions of the parser component 402. The filter component 404 can utilize the filtering update information to update and enhance the filtering functions of the filter component 404.

For instance, an update of the filtering functions of the filter component 404 can enhance determinations regarding which types of information associated with communication devices are relevant, or more relevant (e.g., more relevant than other types of information), when determining whether a malicious event against the RAN 202 is occurring. For example, at a first time, it can be determined that a particular type of information is not particularly relevant to determining whether a malicious event against the RAN 202 is occurring, and therefore, the filtering criteria utilized by the filter component 404 can result in that particular type of information not being included in the filtered or relevant information. Based at least in part on analysis results of analyzing information relating to communication devices, the parsed information, and/or other desired information, the machine learning component 406 can learn that the particular type of information actually does have sufficient relevance to determining whether a malicious event against the RAN 202 is occurring. Accordingly, the machine learning component 406 can generate filtering update information that can indicate that the particular type of information is relevant to determining whether a malicious event against the RAN 202 is occurring, and the filtering functions of the filter component 404 can be updated, based at least in part on such filtering update information, such that the filter component 404, when analyzing and filtering parsed information, can determine that the particular type of information (if in the parsed information) can be relevant and can include it in the filtered (e.g., relevant) information generated by the filter component 404 and sent to the detector component 408 of the SMC 220.

In some embodiments, the machine learning component 406 also can determine an initial or continuous (e.g., adapted) baseline (e.g., a defined baseline), based at least in part on the results of the analysis of the parsed information and/or other parsing and/or filtering-related information, previous analysis of historical (e.g., previous) parsed information and/or other parsing and/or filtering-related information, and/or other desired information (as indicated at reference numeral 310 of FIG. 3). The other desired information can comprise, for example, information relating to malicious event determinations made by and received from the detector component 408. The defined baseline (e.g., initial or continuous baseline) can be utilized by the detector component 408 to facilitate detecting or determining whether a malicious event against the RAN 202 by certain communication devices (e.g., plurality of communication devices 204) is occurring or at least potentially is occurring, as more fully described herein. The defined baseline can specify respective baseline parameters (e.g., respective threshold parameter values) regarding respective characteristics associated with the communication devices. If all or a sufficient number of the respective baseline parameters are determined to be satisfied (e.g., met or exceeded, or breached), for example, by the detector component 408, a determination can be made that a malicious event against the RAN 202 by certain communication devices (e.g., plurality of communication devices 204) is occurring or at least potentially is occurring, in accordance with the defined network security criteria.

In certain embodiments, the machine learning component 406 can apply respective weights to the respective baseline parameters of the defined baseline, based at least in part the determined respective significance of the respective baseline parameters, in accordance with the defined network security criteria. For example, the machine learning component 406 can determine that a first baseline parameter can be more relevant or significant in determining whether a malicious event against the RAN 202 is occurring than a second baseline parameter, and accordingly, the machine learning component 406 can apply a first weight (e.g., a higher weight) to the first baseline parameter and a second weight (e.g., a relatively lower weight) to the second baseline parameter. The baseline parameters of the defined baseline can comprise various types of parameters (e.g., type of communication device, location of communication device, type of attach request or other communication, time of attach request or other communication, and/or number of communication devices in a given area, . . . ), such as those parameters described herein or any other desired type of parameter.

The machine learning component 406 can learn, based at least in part on continued analysis of parsed information, other parsing and/or filtering-related information, malicious event determination-related information, external information relating to malicious event determinations, and/or other desired information, enhancements that can be made to the defined baseline, including respective baseline parameters, to enhance the detection of malicious events against the RAN 202. Based at least in part on such learning and enhancements, the machine learning component 406 can modify (e.g., adapt, adjust, change, or update) the defined baseline to generate an updated defined baseline (or update information that can be used to update the defined baseline), in accordance with the defined network security criteria.

Referring again to the filter component 404, the filter component 404 can communicate the filtered information, comprising the relevant information, associated with the communication devices (e.g., communication device 222, plurality of communication devices 204, or other communication devices) to the detector component 408 for analysis by the detector component 408 (as depicted at reference numeral 314 of FIG. 3). The detector component 408 can detect or determine malicious events (e.g., malicious attacks) by certain communication devices (e.g., plurality of communication devices 204) against the RAN 202 (e.g., during a DDoS attack by massive IoT against the RAN 202), based at least in part on the defined baseline (e.g., initial baseline or updated defined baseline, as applicable) and detection algorithms (as indicated at reference numeral 316 of FIG. 3).

Employing the detection algorithms, the detector component 408 can analyze the filtered information, comprising the relevant information, relating to the communication devices and/or associated messages, in relation to the defined baseline, to facilitate determining whether a malicious event (e.g., malicious attack) against the RAN by at least some of the communication devices (e.g., plurality of communication devices 204) is occurring. For instance, the detector component 408 can analyze the filtered information to determine respective characteristics associated with the respective communication devices (e.g., communication device 222 and plurality of communication devices 204), wherein the respective characteristics associated with the respective communication devices can be utilized to facilitate determining whether there is a malicious event against the RAN occurring. As part of the analysis, the detector component 408 can compare respective parameters (e.g., parameter values) of the respective characteristics against corresponding baseline parameters of the defined baseline to determine whether the defined baseline has been satisfied (e.g., met or exceeded, or breached), which, if satisfied, can indicate that a malicious event against the RAN 202 is occurring.

In certain embodiments, the defined baseline can comprise one or more threshold parameter values associated with one or more baseline parameters of one or more characteristics associated with communication devices. If a parameter value of a characteristic of the respective characteristics associated with the communication devices satisfies (e.g., meets or exceeds (or is lower than, as applicable), or breaches) the applicable threshold parameter value, the detector component 408 can determine that such satisfaction of the applicable threshold parameter value can be indicative of a malicious event against the RAN 202 occurring.

Based at least in part on the results of such analysis, including the results of such comparison of respective parameters of the respective characteristics to corresponding baseline parameters of the defined baseline, the detector component 408 can determine whether the defined baseline has been satisfied (e.g., met or exceeded, or breached), and accordingly, can determine (e.g., can make at least a preliminary or initial determination) whether a malicious event against the RAN 202 by at least some of the communication devices (e.g., plurality of communication devices 204) is occurring.

For instance, if, based at least in part on the comparison results from the comparison of respective parameters of the respective characteristics to the defined baseline, the detector component 408 determines that the defined baseline is satisfied and there is sufficient evidence of a malicious event against the RAN 202 occurring (e.g., due to certain parameter values of certain parameters associated with certain characteristics satisfying their respective defined threshold parameter values), the detector component 108 can determine (e.g., can make a preliminary or initial determination) that a malicious event against the RAN 202 by at least some of the communication devices (e.g., plurality of communication devices 204) is occurring, in accordance with the defined network security criteria. Alternatively, if, based at least in part on the comparison results from the comparison to the defined baseline, the detector component 408 determines that the defined baseline is not satisfied and there is not sufficient evidence of a malicious event against the RAN 202 occurring (e.g., due to a lack of certain parameter values of certain parameters associated with certain characteristics satisfying their respective defined threshold parameter values), the detector component 408 can determine (e.g., can make a preliminary or initial determination) that there is no malicious event against the RAN 202 occurring, in accordance with the defined network security criteria.

If the detector component 408 determines that no malicious event against the RAN 202 occurring, the detector component 408 can communicate information indicating no malicious event is occurring to a connection manager component 410 of the SMC 220. Accordingly, in response to receiving the information indicating that no malicious event is occurring, the connection manager component 410 can allow the communication devices to connect to the RAN 202. The SMC 220 can continue to monitor the communication network, including the RAN 202 and communication devices attempting to connect to, or already connected to, the RAN 202.

If, instead, the detector component 408 determines (e.g., makes a preliminary or initial determination) that a malicious event against the RAN 202 by at least some of the communication devices (e.g., plurality of communication devices 204) is occurring, the detector component 408 can employ a false positive checker component 412 to determine whether or not such determination of a malicious event against the RAN 202 is a false positive indication of a malicious event against the RAN 202 (as indicated at reference numeral 318 of FIG. 3).

The false positive checker component 412 can perform additional analysis (e.g., deeper or more detailed analysis) on the information relating the communication devices and/or associated messages (e.g., the filtered information comprising the relevant information), including the respective characteristics associated with the respective communication devices. Based at least in part on the results of such analysis, the false positive checker component 412 can determine whether or not such determination of a malicious event against the RAN 202 is a false positive indication of a malicious event against the RAN 202. In some embodiments, the functions of the false positive checker component 412 can be enhanced based at least in part on feedback information (e.g., false positive checker update information) received from the machine learning component 406, as more fully described herein. As a result, the false positive checker component 412, including its false positive checking functions, can continue to be improved to enhance determinations, by the false positive checker component 412, regarding whether or not a determination of a malicious event against the RAN 202 is a false positive indication of a malicious event against the RAN 202.

If the false positive checker component 412 determines that the preliminary determination of a malicious event against the RAN 202 (e.g., by the detector component 408) is a false positive, the false positive checker component 412 can communicate information relating to (e.g., indicating) the false positive determination to a decision component 414 of the detector component 408 (as depicted at reference numeral 320 of FIG. 3). The decision component 414 can determine or decide whether the malicious event against the RAN 202 is occurring based at least in part on the information received from the false positive checker component 412 (as indicated at reference numeral 322 of FIG. 3.) Based at least in part on the information relating to the false positive determination, the decision component 414 can determine that no malicious event against the RAN 202 is occurring (as indicated at reference numeral 324 of FIG. 3).

As a result, the detector component 408 can communicate information indicating no malicious event against the RAN 202 is occurring to the connection manager component 410. In response to receiving the information indicating that no malicious event against the RAN 202 is occurring, the connection manager component 410 can allow the communication devices to connect to the RAN 202. At this point, the SMC 220 can continue to monitor the communication network, including the RAN 202 and communication devices attempting to connect to, or already connected to, the RAN 202.

Alternatively, if the false positive checker component 412 determines that the preliminary determination of a malicious event against the RAN 202 is not a false positive, the false positive checker component 412 can communicate information relating to (e.g., indicating) the non-false positive determination to the decision component 414 (as depicted at reference numeral 320 of FIG. 3). For instance, based at least in part on the information relating to the non-false positive determination, the decision component 414 can determine that the preliminary determination of a malicious event against the RAN 202 occurring is not a false positive, and can determine that there is a malicious event against the RAN 202 by at least some of the communication devices (e.g., plurality of communication device 204) occurring (as depicted at reference numeral 326 of FIG. 3).

In response to determining that there is a malicious event against the RAN 202 occurring, the decision component 414 can communicate information indicating that the malicious event against the RAN 202 is occurring (as depicted at reference numeral 326 of FIG. 3), wherein the detector component 408 or filter component 404 can communicate the filtered information, comprising the relevant information, to the connection manager component 410 to facilitate determining whether to block or allow respective communication devices to connect to the RAN 202.

With regard to the communication devices (e.g., communication device 222, plurality of communication devices 204, or other communication devices) attempting to connect to the RAN 202 or already connected to the RAN 202 during the malicious event, the connection manager component 410 can determine which communication device(s) (e.g., high priority or critical device(s)) is associated with a high priority level and which communication device(s) (e.g., low priority or non-critical device(s)) is associated with a relatively lower priority level, in accordance with the defined network security criteria (as depicted at reference numeral 328 of FIG. 3). For instance, with regard to the communication devices (e.g., communication device 222, plurality of communication devices 204, or other communication devices) attempting to connect to the RAN 202 during the malicious event via an initial attach request and/or connected to the RAN 202 and submitting an update request, the connection manager component 410 can analyze respective information relating to the respective communication devices and/or associated messages (e.g., respective items of the filtered information (e.g., relevant information) relating to the respective communication devices and/or associated messages). With regard to a communication device, one or more particular items of information (e.g., certain items of relevant information) can specify or indicate a priority level associated with the communication device or associated message. For example, a particular item of information associated with a communication device can specify or indicate whether the communication device or associated message is associated with higher priority level (e.g., a higher priority level for emergency data communications, mission critical data communications, or other type of high priority data communications). Based at least in part on the results of such analysis, the connection manager component 410 can determine respective priority levels associated with the respective communication devices and/or their associated messages.

With regard to each communication device (e.g., communication device 222, or a device of the plurality of communication devices 204, or another communication device) attempting to connect to the RAN 202 or already connected to the RAN 202 during the malicious event, the connection manager component 410 can compare the priority level associated with the communication device and/or associated message with the defined threshold priority level to determine whether the priority level satisfies (e.g., meets or exceeds; or breaches) the defined threshold priority level. Based at least in part on the results of such comparison, the connection manager component 410 can determine whether the priority level associated with the communication device or associated message satisfies the defined threshold priority level, in accordance with the defined security management criteria.

With regard to each communication device under consideration, if the connection manager component 410 determines that the priority level (e.g., a relatively lower priority level) associated with the communication device (e.g., a device of the plurality of communication devices 204) or associated message does not satisfy the defined threshold priority level (e.g., indicating such communication device is associated with a relatively low priority level), the connection manager component 410 can determine that connection of the communication device to the RAN 202 is not permitted (e.g., is disallowed). For instance, the connection manager component 410 can determine that, when such communication device is attempting to connect to the RAN 202, such communication device is to be blocked from connecting to the RAN 202, or, when such communication device is already connected to the RAN 202, such communication device is to be blocked from continuing its connection to the RAN 202 (e.g., such connection is to be terminated, removed, or discontinued).

With regard to each communication device (e.g., a device of the plurality of communication devices 204) that is to be blocked from connecting to, or remaining connected to, the RAN 202, the connection manager component 410 can generate blocking instructions that can be utilized to facilitate blocking or discontinuing connection of the communication device to the RAN 202 (as indicated at reference numeral 330 of FIG. 3). The connection manager component 410 can communicate those blocking instructions to the CU-CP component 212 of the RAN 202 (as indicated at reference numeral 332 of FIG. 3). In response to the blocking instructions, the CU-CP component 212 can block or facilitate blocking the communication device from connecting to, or remaining connected to, the RAN 202.

If, instead, with regard to a communication device under consideration, the connection manager component 410 determines that the priority level (e.g., a higher priority level) associated with the communication device (e.g., communication device 222) or associated message satisfies the defined threshold priority level (e.g., indicating such communication device is associated with a sufficiently high priority level), the connection manager component 410 can determine that the connection of the communication device to the RAN 202 is permitted (e.g., allowed). In response to determining that the communication device (e.g., communication device 222) is permitted to connect to the RAN 202, the connection manager component 410 can generate connection instructions to permit connection of the communication device (e.g., communication device 222) to the RAN 202, and can communicate those connection instructions to the CU-CP component 212. In response to the connection instructions, the CU-CP component 212 can connect or facilitate connecting the communication device (e.g., communication device 222) to the RAN 202 or maintaining such connection to the RAN 202 when the communication device was already connected to the RAN 202.

Referring again to the machine learning component 406, in addition to enhancing parsing and filtering of information, as disclosed herein, the machine learning component 406 can employ machine learning techniques and algorithms to learn how to enhance (e.g., improve or optimize) determinations or detections of malicious events against the RAN 202 by certain communication devices (e.g., communication devices infected with malware), enhance determinations of false positives of preliminary determinations of malicious events against the RAN 202, and enhance determining or distinguishing between communication devices associated with higher priority levels and communication devices associated with lower priority levels.

In some embodiments, the detector component 408, including the false positive checker component 412, can communicate the malicious event determination and/or false positive determination-related information relating to the malicious event determinations and/or false positive determinations and/or the other desired information to the machine learning component 406 for analysis (as indicated at reference numerals 334 and 336 of FIG. 3). The malicious event determination and/or false positive determination-related information can comprise the respective information (e.g., relevant information) analyzed by the detector component 408 and/or false positive checker component 412 in connection with rendering their respective determinations regarding malicious events, information relating to the malicious event determination criteria employed by the detector component 408, and/or information relating to the false positive determination criteria employed by the false positive checker component 412. The other desired information that can received by the machine learning component 408 can comprise, for example, the parsing and/or filtering-related information received from the parser component 402 and/or filter component 404, as disclosed herein, and/or the priority device determination-related information relating to determining or distinguishing between communication devices associated with priority communications and communication devices associated with non-priority communications, which can be received from the connection manager component 410.

The machine learning component 406, employing the machine learning techniques and algorithms, can perform machine learning analysis on the malicious event determination and/or false positive determination information, the parsing and/or filtering-related information, the priority device determination-related information, historical (e.g., previous) malicious event determination, historical false positive determination information, historical parsing and/or filtering-related information, historical priority device determination-related information, and/or other desired information (e.g., external information received from external data sources). Based at least in part on the results of such analysis, the machine learning component 406 can determine the malicious event determination update information that can be used to update the detector component 408 and/or false positive determination update information that can be used to update the false positive checker component 412 to enhance detection or determination of malicious events against the RAN 202 and/or determination of whether a preliminary determination of a malicious event against the RAN 202 is a false positive or not, respectively, in accordance with the defined network security criteria.

For example, based at least in part on the results of such analysis, the machine learning component 406, employing the machine learning techniques and algorithms, can learn how to enhance (e.g., improve or optimize) detection or determination of malicious events against the RAN 202 and/or determination of whether a preliminary determination of a malicious event against the RAN 202 is a false positive or not, in accordance with the defined network security criteria. For instance, the machine learning component 406 can learn which characteristics or groups of characteristics associated with communication devices and/or parameter values of such characteristics can be more relevant or determinative on the issue of whether there is a malicious event against the RAN 202 occurring and/or the issue of whether a preliminary determination of a malicious event against the RAN 202 is a false positive or not. The machine learning component 406 also can learn respective defined threshold parameter values associated with respective baseline parameters of respective characteristics associated with communication devices that can improve determinations regarding whether a malicious event against the RAN 202 is occurring and improve determinations regarding whether a preliminary determination of a malicious event against the RAN 202 is a false positive or not.

Based at least in part on such learning, the machine learning component 406 can determine the malicious event determination update information and/or false positive determination update information (e.g., feedback information) relating to such enhancement of the detection or determination of malicious events against the RAN 202 and/or determination of whether a preliminary determination of a malicious event against the RAN 202 is a false positive or not. The malicious event determination update information can comprise or relate to modifications that can be made to the detector functions (e.g., malicious event determination functions) of the detector component 408 to enhance detection or determination of malicious events against the RAN 202, wherein such modifications can comprise or relate to modifications (e.g., adjustments, changes, or updates) to the types of characteristics or groups of characteristics associated with communication devices that are considered relevant or determinative for determining whether a malicious event against the RAN 202 is occurring, modifications to respective defined threshold parameter values associated with respective baseline parameters of respective characteristics associated with communication devices and/or other modifications, and/or other modifications to the defined baseline to generate an updated defined baseline. The false positive determination update information can comprise or relate to modifications that can be made to the false positive determination functions of the false positive checker component 412 to enhance determinations regarding whether a preliminary determination of a malicious event against the RAN 202 is a false positive or not, wherein such modifications can comprise or relate to modifications to the types of characteristics or groups of characteristics associated with communication devices that are considered relevant or determinative for determining whether a malicious event against the RAN 202 is occurring (e.g., determining whether a preliminary determination of a malicious event against the RAN 202 is a false positive or not), respective threshold parameter values to apply to parameters of respective characteristics associated with communication devices, modifications of conditions or events (and associated characteristics associated with communication devices and associated parameters values) that can be indicative or determinative of whether a preliminary determination of a malicious event against the RAN 202 is a false positive or not, and/or other types of modifications.

The machine learning component 406 can communicate the malicious event determination update information to the detector component 408 (as depicted at reference numeral 338 of FIG. 3) and/or the false positive determination update information to the false positive checker component 412 (as indicated at reference numeral 340 of FIG. 3). The SMC 220 (e.g., the detector component 408 or other component of the SMC 220) can modify the detector functions (e.g., malicious event determination functions) of the detector component 408, based at least in part on the malicious event determination update information, to enhance the detection or determination of malicious events against the RAN 202. The SMC 220 (e.g., the false positive checker component 412 or other component of the SMC 220) can modify the malicious event determination functions of the detector component 408, based at least in part on the false positive determination update information, to enhance determinations regarding whether a preliminary determination of a malicious event against the RAN 202 is a false positive or not.

With regard to the connection manager component 410, the connection manager component 410 can communicate priority device determination-related information relating to determining or distinguishing between communication devices associated with priority communications and communication devices associated with non-priority communications and/or other desired (e.g., pertinent) information to the machine learning component 406 for machine learning analysis (as depicted at reference numeral 342 of FIG. 3). The priority device determination-related information can comprise the information analyzed by the connection manager component 410 in connection with rendering determinations regarding the respective priority levels of respective communication devices and determinations regarding whether the respective priority levels satisfy the defined threshold priority level, information relating to the defined threshold priority level, and/or information relating to the connection management criteria, including blocking criteria, employed by the connection manager component 410.

The machine learning component 406, employing the machine learning techniques and algorithms, can perform machine learning analysis on the priority device determination-related information as well as other information, such as the historical priority device determination-related information, the parsing and/or filtering-related information, the historical parsing and/or filtering-related information, the malicious event determination information, the historical malicious event determination, the false positive determination information, the historical false positive determination information, external information received from external data sources, and/or other desired information. Based at least in part on the results of such analysis, the machine learning component 406 can determine connection management update information that can be used to update the connection manager component 410 to enhance determinations regarding whether to block connections of communication devices or allow connections of communication devices to the RAN 202 during a malicious event against the RAN 202.

For instance, the machine learning component 406 can employ machine learning techniques and algorithms to learn how to enhance (e.g., improve or optimize) determinations regarding whether to block or allow connections of communication devices to the RAN 202 during a malicious event against the RAN 202, based at least in part on the result of the machine learning analysis, in accordance with the defined network security criteria. For example, the machine learning component 406 can learn modifications that can be made to the defined threshold priority level that is to be applied when determining whether a priority level associated with a communication device is sufficiently high enough to allow the communication device to connect to the RAN 202 during a malicious event to enhance such connection management determinations and/or modifications that can be made to other connection management criteria or functions that can enhance the performance of connection management functions by the connection manager component 410.

Based at least in part on such learning, the machine learning component 406 can determine the connection management update information (e.g., feedback information) relating to such enhancement of the determinations regarding whether to block or allow connections of communication devices to the RAN 202 during a malicious event against the RAN 202. The machine learning component 406 can communicate the connection management update information to the connection manager component 410 to facilitate updating the connection management functions of the connection manager component 410 (as indicated at reference numeral 344 of FIG. 3).

The SMC 220 (e.g., the connection manager component 410 or other component of the SMC 220) can modify the connection management functions of the connection manager component 410, based at least in part on the connection management update information, to enhance determinations of priority levels associated with communication devices and associated messages, determination of the defined threshold priority level to apply when making connection management determinations, determinations regarding whether priority levels associated with communication devices and/or associated messages satisfy the defined threshold priority level, determinations regarding whether a communication device is to be permitted to connect to the RAN 202 (e.g., during a malicious event against the RAN 202), and/or determinations regarding whether a communication device is to be blocked from connecting to the RAN 202 (e.g., during a malicious event against the RAN 202). For example, the SMC 220 can modify the defined threshold priority level to an updated defined threshold priority level that is indicated or specified in the connection management update information.

In certain embodiments, the SMC 220 can include a post-process analytics component 416 that can perform post-process analytics relating to malicious event determinations, connection management determinations, and/or other operations of the SMC 220, and/or can receive information relating to post-process analytics performed by another device or component (e.g., a communication device associated with the communication network) to facilitate enhancing performance of the SMC 220 with regard to making malicious event determinations, determining which communication devices can be connected to the RAN 202 during a malicious event, and/or otherwise enhancing performance of the SMC 220 (and the RAN 202). For instance, the post-process analytics component 416 (or the communication device that communicates the post-process analytics information to the post-process analytics component 416) can analyze information relating to malicious event determinations to determine or facilitate determining whether a determination by the detector component 408 that a malicious event against the RAN 202 occurred was a proper (e.g., correct or accurate) determination, determine or facilitate determining whether the detector component 408 failed to detect and classify a malicious event against the RAN 202 that occurred, determine or facilitate determining whether the false positive checker component 412 incorrectly determined that an actual malicious event against the RAN 202 was a false positive, and/or other desired types of analysis or determinations relating to malicious events. Based at least in part on the results of such analysis, the post-process analytics component 416 (or the communication device that communicates the post-process analytics information to the post-process analytics component 416) can determine modifications that can be made to the detector component 408 (or other component(s) of the SMC 220, such as parser component 402 or filter component 404, . . . ) to enhance (e.g., improve or optimize) determinations (e.g., preliminary determinations and/or false positive determinations) relating to malicious events against the RAN 202, and can generate post-process analytics information relating to such determination enhancements. The post-process analytics information can be utilized to modify the detector component 408 (or other component(s) of the SMC 220, such as parser component 402 or filter component 404, . . . ) to enhance the performance of the detector component 408 (or the other component(s) of the SMC 220).

As another example, the post-process analytics component 416 (or the communication device that communicates the post-process analytics information to the post-process analytics component 416) can analyze information relating to connection management determinations to determine or facilitate determining whether a communication device associated with a sufficiently high priority level was improperly blocked from connecting to the RAN 202 or was improperly disconnected from the RAN 202 during a mitigation action performed by the SMC 220 during a malicious event against the RAN 202, or determine or facilitate determining whether a communication device associated with a relatively low priority level was allowed to connect, or allowed to remain being connected, to the RAN 202 during a mitigation action performed by the SMC 220 during a malicious event against the RAN 202. Based at least in part on the results of such analysis, the post-process analytics component 416 (or the communication device that communicates the post-process analytics information to the post-process analytics component 416) can determine modifications that can be made to the connection manager component 410 (or other component(s) of the SMC 220, such as parser component 402 or filter component 404, . . . ) to enhance (e.g., improve or optimize) determinations relating to managing connections of communication devices during malicious events against the RAN 202, and can generate post-process analytics information relating to such determination enhancements. The post-process analytics information can be utilized to modify the connection manager component 410 (or other component(s) of the SMC 220, such as parser component 402 or filter component 404, . . . ) to enhance the performance of the connection manager component 410 (or the other component(s) of the SMC 220).

In some embodiments, the SMC 220 can comprise an operations manager component 418 that can control (e.g., manage) operations associated with the SMC 220. For example, the operations manager component 418 can facilitate generating instructions to have components of the SMC 220 perform operations, and can communicate respective instructions to respective components (e.g., parser component 402, filter component 404, machine learning component 406, detector component 408, connection manager component 410, . . . ) of the SMC 220 to facilitate performance of operations by the respective components of the SMC 220 based at least in part on the instructions, in accordance with the defined network security criteria and network security algorithms (e.g., parsing algorithms, filtering algorithms, machine learning algorithms, malicious event detection algorithms, false positive determination algorithms, connection management algorithms, etc., as disclosed, defined, recited, or indicated herein by the methods, systems, and techniques described herein). The operations manager component 418 also can facilitate controlling data flow between the respective components of the SMC 220 and controlling data flow between the SMC 220 and another component(s) or device(s) (e.g., a communication device, a base station or other network component or device of the communication network, data sources, or applications, . . . ) associated with (e.g., connected to) the SMC 220.

The SMC 220 also can include a processor component 420 that can work in conjunction with the other components (e.g., parser component 402, filter component 404, machine learning component 406, detector component 408, connection manager component 410, . . . , and data store 420) to facilitate performing the various functions of the SMC 220. The processor component 420 can employ one or more processors, microprocessors, or controllers that can process data, such as information relating to communication devices, characteristics associated with communication devices or groups of communication devices, identifiers or authentication credentials associated with communication devices, network conditions, metadata, messages, data parsing, data filtering, malicious events, malicious event determinations, false positive determinations, connection management determinations, parameters, defined baselines, baseline parameters, threshold values associated with baseline parameters, defined threshold priority levels, traffic flows, policies, defined network security criteria, algorithms (e.g., parsing algorithms, filtering algorithms, machine learning algorithms, malicious event detection algorithms, false positive determination algorithms, connection management algorithms, etc.), protocols, interfaces, tools, and/or other information, to facilitate operation of the SMC 220, as more fully disclosed herein, and control data flow between the SMC 220 and other components (e.g., a communication device, a base station or other network component or device of the communication network, data sources, applications, . . . ) associated with the SMC 220.

The data store 422 can store data structures (e.g., user data, metadata), code structure(s) (e.g., modules, objects, hashes, classes, procedures) or instructions, information relating to communication devices, characteristics associated with communication devices or groups of communication devices, identifiers or authentication credentials associated with communication devices, network conditions, metadata, messages, data parsing, data filtering, malicious events, malicious event determinations, false positive determinations, connection management determinations, parameters, defined baselines, baseline parameters, threshold values associated with baseline parameters, defined threshold priority levels, traffic flows, policies, defined network security criteria, algorithms (e.g., parsing algorithms, filtering algorithms, machine learning algorithms, malicious event detection algorithms, false positive determination algorithms, connection management algorithms, etc.), protocols, interfaces, tools, and/or other information, to facilitate controlling operations associated with the SMC 220. In an aspect, the processor component 420 can be functionally coupled (e.g., through a memory bus) to the data store 422 in order to store and retrieve information desired to operate and/or confer functionality, at least in part, to the parser component 402, filter component 404, machine learning component 406, detector component 408, connection manager component 410, post-process analytics component 416, operations manager component 418, and data store 420, etc., and/or substantially any other operational aspects of the SMC 220.

Described herein are systems, methods, articles of manufacture, and other embodiments or implementations that can facilitate detecting and mitigating malicious events against a RAN of a communication network, and managing connection of communication devices to the RAN, as more fully described herein. The detecting and mitigating malicious events against a RAN of a communication network, and managing connection of communication devices to the RAN, and/or other features of the disclosed subject matter, can be implemented in connection with any type of device with a connection to, or attempting to connect to, the communication network (e.g., a wireless or mobile device, a computer, a handheld device, etc.), any Internet of things (IoT) device (e.g., health monitoring device, toaster, coffee maker, blinds, music players, speakers, etc.), and/or any connected vehicles (e.g., cars, airplanes, space rockets, and/or other at least partially automated vehicles (e.g., drones)). In some embodiments, the non-limiting term user equipment (UE) is used. It can refer to any type of wireless device that communicates with a radio network node in a cellular or mobile communication system. Examples of UE can be a target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles, etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller component that can control routing of traffic within the network and between the network and traffic destinations. The SDN controller component can be merged with the 5G network architecture to enable service deliveries via open Application Programming Interfaces (APIs) and move the network core towards an all Internet Protocol (IP), cloud based, and software driven telecommunications network. The SDN controller component can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 5:
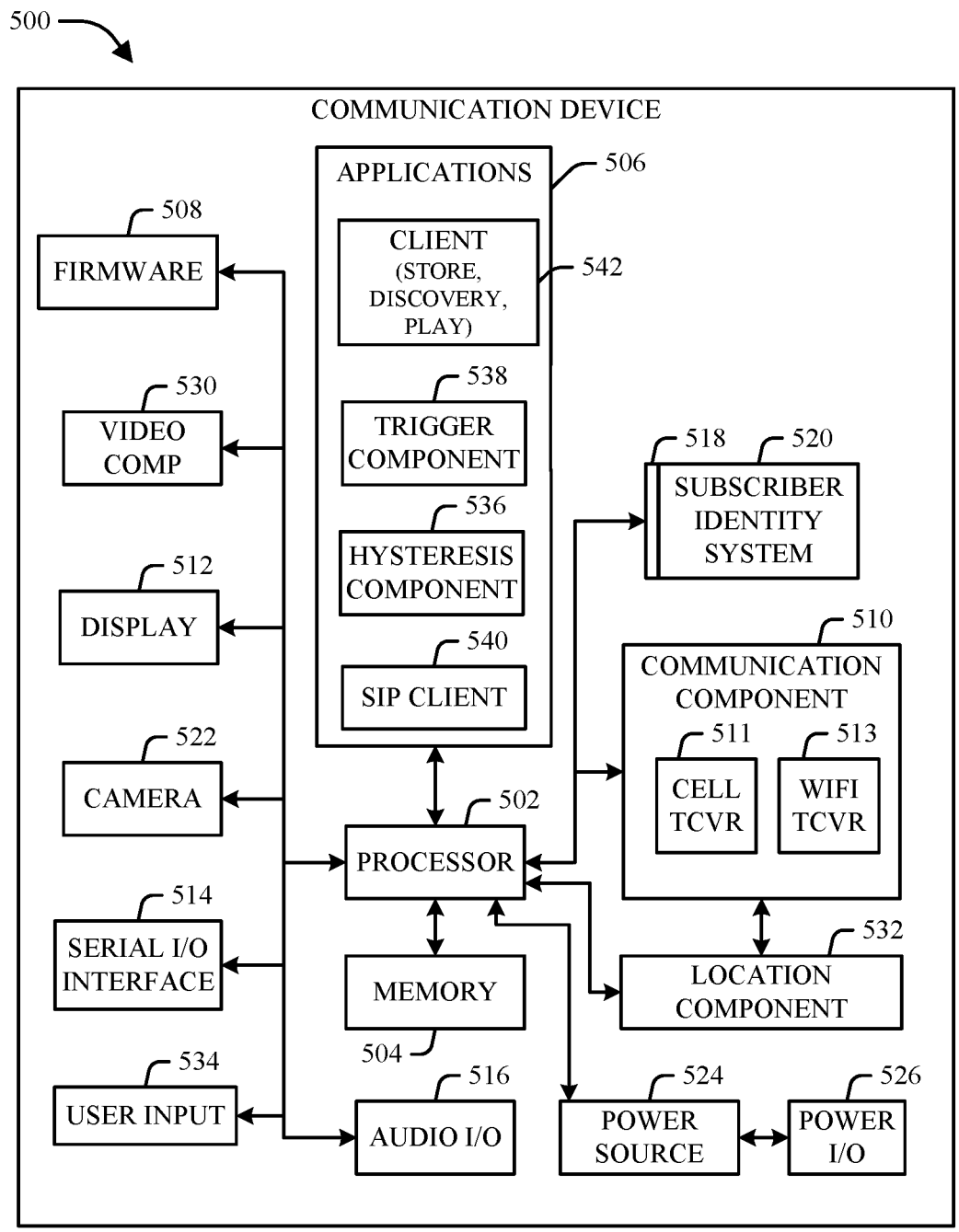
FIG. 5 depicts a block diagram of example communication device, in accordance with various aspects and embodiments of the disclosed subject matter.

Referring now to FIG. 5, depicted is an example block diagram of an example communication device 500 (e.g., wireless or mobile phone, electronic pad or tablet, electronic eyewear, electronic watch, or other electronic bodywear, or IoT device, . . . ) operable to engage in a system architecture that facilitates wireless communications according to one or more embodiments described herein. Although a communication device is illustrated herein, it will be understood that other devices can be a communication device, and that the communication device is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The communication device 500 can include a processor 502 for controlling and processing all onboard operations and functions. A memory 504 interfaces to the processor 502 for storage of data and one or more applications 506 (e.g., a video player software, user feedback component software, etc.). Other applications can include voice recognition of predetermined voice commands that facilitate initiation of the user feedback signals. The applications 506 can be stored in the memory 504 and/or in a firmware 508, and executed by the processor 502 from either or both the memory 504 or/and the firmware 508. The firmware 508 can also store startup code for execution in initializing the communication device 500. A communication component 510 interfaces to the processor 502 to facilitate wired/wireless communication with external systems, e.g., cellular networks, VoIP networks, and so on. Here, the communication component 510 can also include a suitable cellular transceiver 511 (e.g., a GSM transceiver) and/or an unlicensed transceiver 513 (e.g., Wi-Fi, WiMax) for corresponding signal communications. The communication device 500 can be a device such as a cellular telephone, a PDA with mobile communications capabilities, and messaging-centric devices. The communication component 510 also facilitates communications reception from terrestrial radio networks (e.g., broadcast), digital satellite radio networks, and Internet-based radio services networks.

The communication device 500 includes a display 512 for displaying text, images, video, telephony functions (e.g., a Caller ID function), setup functions, and for user input. For example, the display 512 can also be referred to as a "screen" that can accommodate the presentation of multimedia content (e.g., music metadata, messages, wallpaper, graphics, etc.). The display 512 can also display videos and can facilitate the generation, editing and sharing of video quotes. A serial I/O interface 514 is provided in communication with the processor 502 to facilitate wired and/or wireless serial communications (e.g., USB, and/or IEEE 1394) through a hardwire connection, and other serial input devices (e.g., a keyboard, keypad, and mouse). This supports updating and troubleshooting the communication device 500, for example. Audio capabilities are provided with an audio I/O component 516, which can include a speaker for the output of audio signals related to, for example, indication that the user pressed the proper key or key combination to initiate the user feedback signal. The audio I/O component 516 also facilitates the input of audio signals through a microphone to record data and/or telephony voice data, and for inputting voice signals for telephone conversations.

The communication device 500 can include a slot interface 518 for accommodating a SIC (Subscriber Identity Component) in the form factor of a card Subscriber Identity Module (SIM) or universal SIM 520, and interfacing the SIM card 520 with the processor 502. However, it is to be appreciated that the SIM card 520 can be manufactured into the communication device 500, and updated by downloading data and software.

The communication device 500 can process IP data traffic through the communication component 510 to accommodate IP traffic from an IP network such as, for example, the Internet, a corporate intranet, a home network, a person area network, etc., through an ISP or broadband cable provider. Thus, VoIP traffic can be utilized by the communication device 500 and IP-based multimedia content can be received in either an encoded or a decoded format.

A video processing component 522 (e.g., a camera) can be provided for decoding encoded multimedia content. The video processing component 522 can aid in facilitating the generation, editing, and sharing of video quotes. The communication device 500 also includes a power source 524 in the form of batteries and/or an AC power subsystem, which power source 524 can interface to an external power system or charging equipment (not shown) by a power I/O component 526.

The communication device 500 can also include a video component 530 for processing video content received and, for recording and transmitting video content. For example, the video component 530 can facilitate the generation, editing and sharing of video quotes. A location tracking component 532 facilitates geographically locating the communication device 500. As described hereinabove, this can occur when the user initiates the feedback signal automatically or manually. A user input component 534 facilitates the user initiating the quality feedback signal. The user input component 534 can also facilitate the generation, editing and sharing of video quotes. The user input component 534 can include such conventional input device technologies such as a keypad, keyboard, mouse, stylus pen, and/or touch screen, for example.

Referring again to the applications 506, a hysteresis component 536 facilitates the analysis and processing of hysteresis data, which is utilized to determine when to associate with the access point. A software trigger component 538 can be provided that facilitates triggering of the hysteresis component 536 when the Wi-Fi transceiver 513 detects the beacon of the access point. A SIP client 540 enables the communication device 500 to support SIP protocols and register the subscriber with the SIP registrar server. The applications 506 can also include a client 542 that provides at least the capability of discovery, play and store of multimedia content, for example, music.

The communication device 500, as indicated above related to the communication component 510, includes an indoor network radio transceiver 513 (e.g., Wi-Fi transceiver). This function supports the indoor radio link, such as IEEE 802.11, for the dual-mode GSM device (e.g., communication device 500). The communication device 500 can accommodate at least satellite radio services through a device (e.g., handset device) that can combine wireless voice and digital radio chipsets into a single device (e.g., single handheld device).

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 6-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 6:
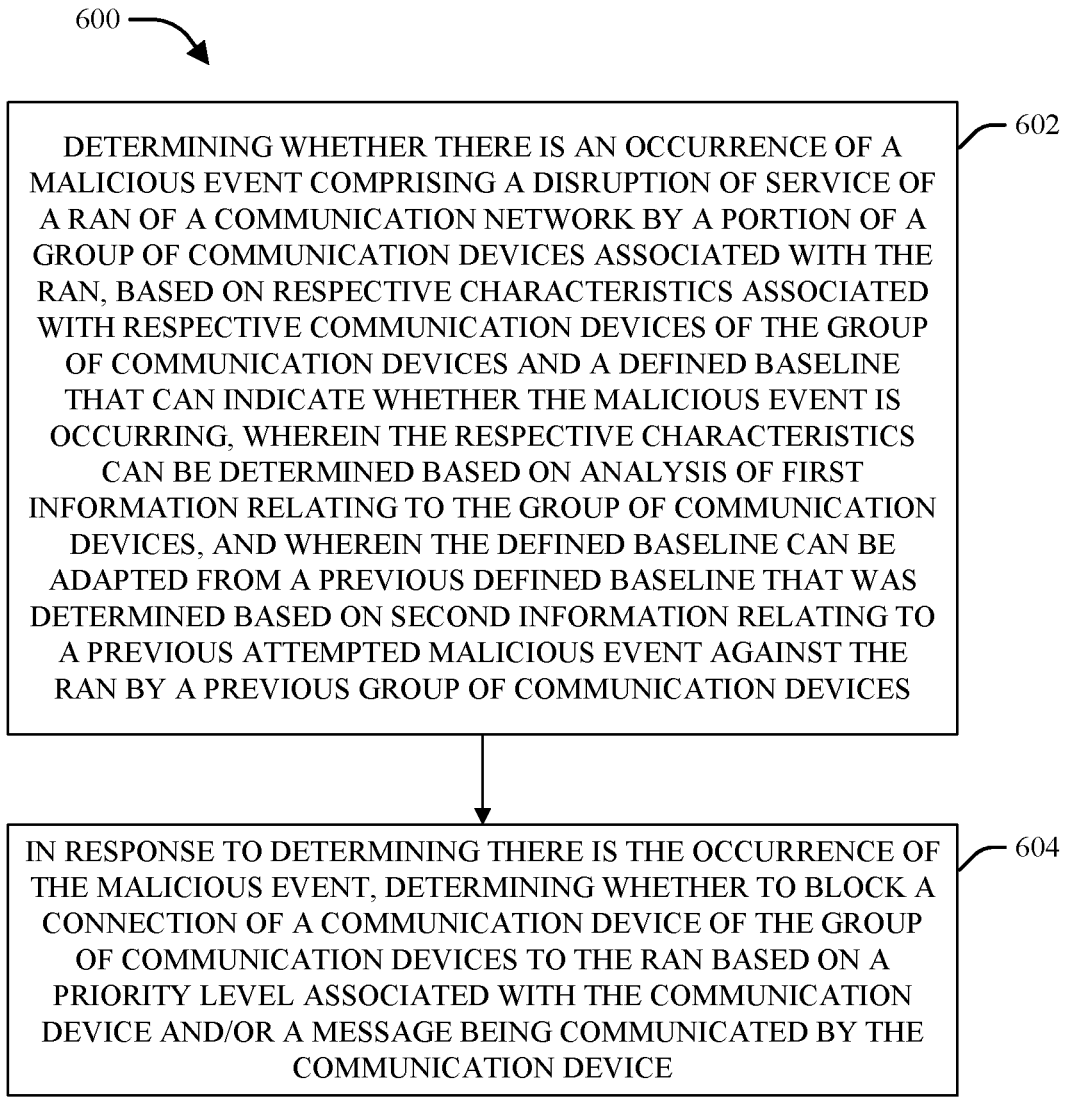
FIG. 6 illustrates a flow chart of an example method that can detect and mitigate malicious events against a RAN of a communication network and can manage connection of communication devices to the RAN, in accordance with various aspects and embodiments of the disclosed subject matter.

FIG. 6 illustrates a flow chart of an example method 600 that detect and mitigate malicious events against a RAN of a communication network and can manage connection of communication devices to the RAN, in accordance with various aspects and embodiments of the disclosed subject matter. The method 600 can be employed by, for example, a system comprising the SMC, a processor component (e.g., of or associated with the SMC), and/or a data store (e.g., of or associated with the SMC).

At 602, a determination can be made regarding whether there is an occurrence of a malicious event comprising a disruption of service of a RAN of a communication network by a portion of a group of communication devices associated with the RAN, based at least in part on respective characteristics associated with respective communication devices of the group of communication devices and a defined baseline that can indicate whether the malicious event is occurring, wherein the respective characteristics can be determined based at least in part on an analysis of first information relating to the group of communication devices, and wherein the defined baseline can be adapted from a previous defined baseline that was determined based at least in part on second information relating to a previous attempted malicious event against the RAN by a previous group of communication devices. The SMC can receive information relating to the communication devices from the communication devices and/or from network devices associated with the RAN, wherein the first information can comprise the information relating to the communication devices. The first information can comprise information from an initial attach request(s) sent by a communication device(s) attempting to connect to the RAN or an update attach request(s) sent by a communication device(s) that is already connected to the RAN and is requesting some type of update (e.g., updated information or updated connection).

The SMC (e.g., employing the parser component, filter component, and/or detector component) can analyze the first information (e.g., analyze the first information in relation to the defined baseline). Based at least in part on the results of the analysis of the first information (e.g., relevant information of the first information), the SMC, employing the detector component, can determine respective characteristics (e.g., attributes) of or associated with respective communication devices of the group of communication devices or associated with a subgroup of the group of communication devices. The SMC, employing the detector component, can determine whether there is an occurrence of a malicious event (e.g., malicious attack) comprising a disruption of service of the RAN by a portion of the group of communication devices associated with (e.g., attempting to connect to, or already connected to) the RAN, based at least in part on the results of analyzing the respective characteristics associated with the respective communication devices, or subgroup of communication devices, and the defined baseline, wherein the defined baseline can indicate whether the malicious event is occurring. The SMC can adapt the defined baseline from a previous defined baseline based at least in part on second information relating to a previous attempted malicious event against the RAN by a previous group of communication devices. In some embodiments, one or more communication devices can be part of the previous group of communication devices and also part of the group, or the portion of the group, of communication devices. In other embodiments, the previous group of communication devices can have no communication device in common with the group, or the portion of the group, of communication devices. That is, devices in the previous group of devices can be completely different from devices in the group, or the portion of the group, of communication devices.

At 604, in response to determining there is the occurrence of the malicious event, a determination can be made regarding whether to block a connection of a communication device of the group of communication devices to the RAN based at least in part on a priority level associated with the communication device and/or a message being communicated by the communication device. In response to the SMC determining there is the occurrence of the malicious event, the SMC can whether to block a connection of a communication device of the group of communication devices to the RAN based at least in part on a priority (e.g., priority or criticality) level associated with the communication device and/or the message being communicated by the communication device. For instance, for each device of the group of communication devices, the SMC can determine whether the message (or associated communication device or associated service) is associated with a priority level that satisfies (e.g., meets or exceeds) a defined threshold priority (e.g., priority or criticality) level, in accordance with the defined network security criteria. In response to the SMC determining that a message associated with a communication device of the group of communication devices does not satisfy the defined threshold priority level, the SMC can determine that the attempted connection to the RAN or current connection to the RAN (as the case may be) by such communication device is to be blocked, and the SMC can block or facilitate blocking the communication device from connecting, or remaining connected, to the RAN. In response to the SMC determining that a message associated with a communication device of the group of communication devices satisfies the defined threshold priority level, the SMC can determine that the attempted connection or current connection to the RAN by such communication device can be permitted, and the SMC can allow such communication device to connect to, or remain connected to, the RAN to communicate the message and/or receive a message.

Figure 7:
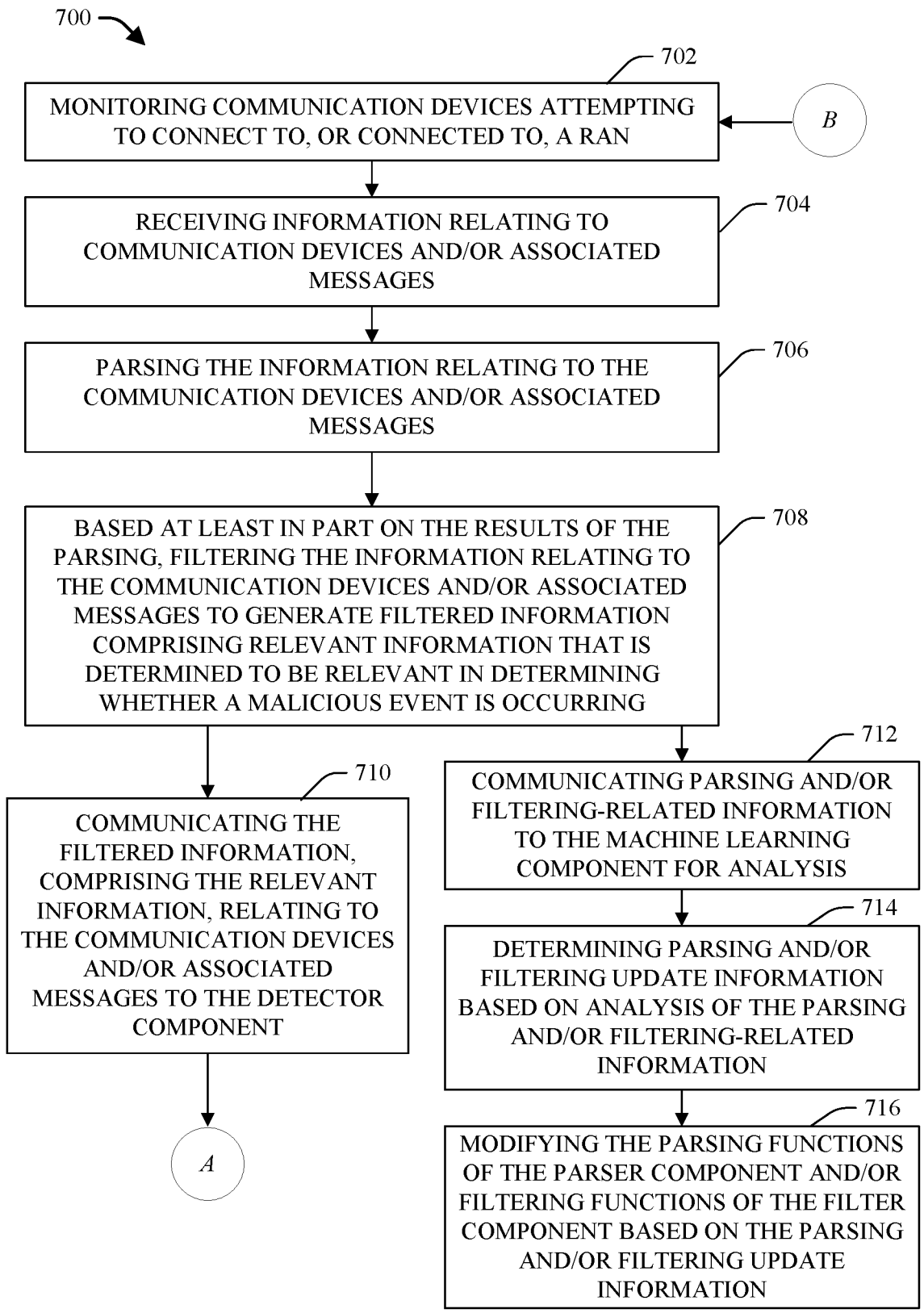
FIG. 7 depicts a flow chart of an example method that can detect and mitigate malicious events against a RAN of a communication network by communication devices and can manage connection of communication devices to the RAN, wherein such method can comprise parsing and filtering of information relating to communication devices associated with the RAN, and can update and enhance parsing functions and filtering functions based at least in part on machine learning analysis, to facilitate the detecting and the mitigating of malicious events against the RAN and the managing of connection of communication devices to the RAN, in accordance with various aspects and embodiments of the disclosed subject matter.

FIG. 7 depicts a flow chart of an example method 700 that can detect and mitigate malicious events against a RAN of a communication network by communication devices and can manage connection of communication devices to the RAN, wherein such method 700 can comprise parsing and filtering of information relating to communication devices associated with the RAN, and can update and enhance parsing functions and filtering functions based at least in part on machine learning analysis, to facilitate the detecting and the mitigating of malicious events against the RAN and the managing of connection of communication devices to the RAN, in accordance with various aspects and embodiments of the disclosed subject matter. The method 700 can be employed by, for example, a system comprising the SMC, a processor component (e.g., of or associated with the SMC), and/or a data store (e.g., of or associated with the SMC).

At 702, communication devices attempting to connect to, or already connected to, a RAN of a communication network can be monitored. The SMC of or associated with the RAN can monitor the communication devices attempting to connect, or connected, to the RAN, including monitoring information relating to such communication devices, to facilitate determining whether a malicious event (e.g., malicious attack) involving a portion of the communication devices is occurring and determining whether to allow or block connections of the communication devices to the RAN.

At 704, information relating to communication devices and/or associated messages can be received. Based at least in part on the monitoring, the RAN can receive the information relating to the communication devices and/or associated messages. For example, when communication devices send initial attach requests to attempt to connect to the RAN, and/or when communication devices connected to the RAN send update attach requests to the RAN seeking an update, the RAN, including the SMC of or associated with the RAN, can receive the information relating to the communication devices and/or associated messages. Such information can comprise, for example, respective attach request information associated with the respective communication devices, other types of information associated with the communication devices (e.g., received from the communication devices or network devices associated with the RAN), and/or respective metadata associated with the respective communication devices, as more fully described herein. The RAN and SMC can receive such information in real time, or at least substantially real time.

At 706, the information relating to the communication devices and/or associated messages can be parsed. At 708, based at least in part on the results of the parsing, the information relating to the communication devices and/or associated messages can be filtered to generate filtered information comprising relevant information that is determined to be relevant in determining whether a malicious event is occurring. The SMC, employing the parser component, can analyze the information relating to the communication devices and/or associated messages and parse such information to facilitate determining relevant information from the information relating to the communication devices and/or associated messages. Based at least in part on the results of the parsing of such information, the SMC, employing the filter component, can determine relevant information from the information relating to the communication devices and/or associated messages, can filter the information relating to the communication devices and/or associated messages to generate the filtered information, comprising the relevant information, and can purge the remaining information. The SMC can analyze, parse, and/or filter such information in real time, or at least substantially real time.

At 710, the filtered information, comprising the relevant information, relating to the communication devices and/or associated messages can be communicated to the detector component of the SMC. The filter component of the SMC can communicate the filtered information, comprising the relevant information, relating to the communication devices and/or associated messages can be communicated to the detector component for analysis by the detector component.

Figure 8:
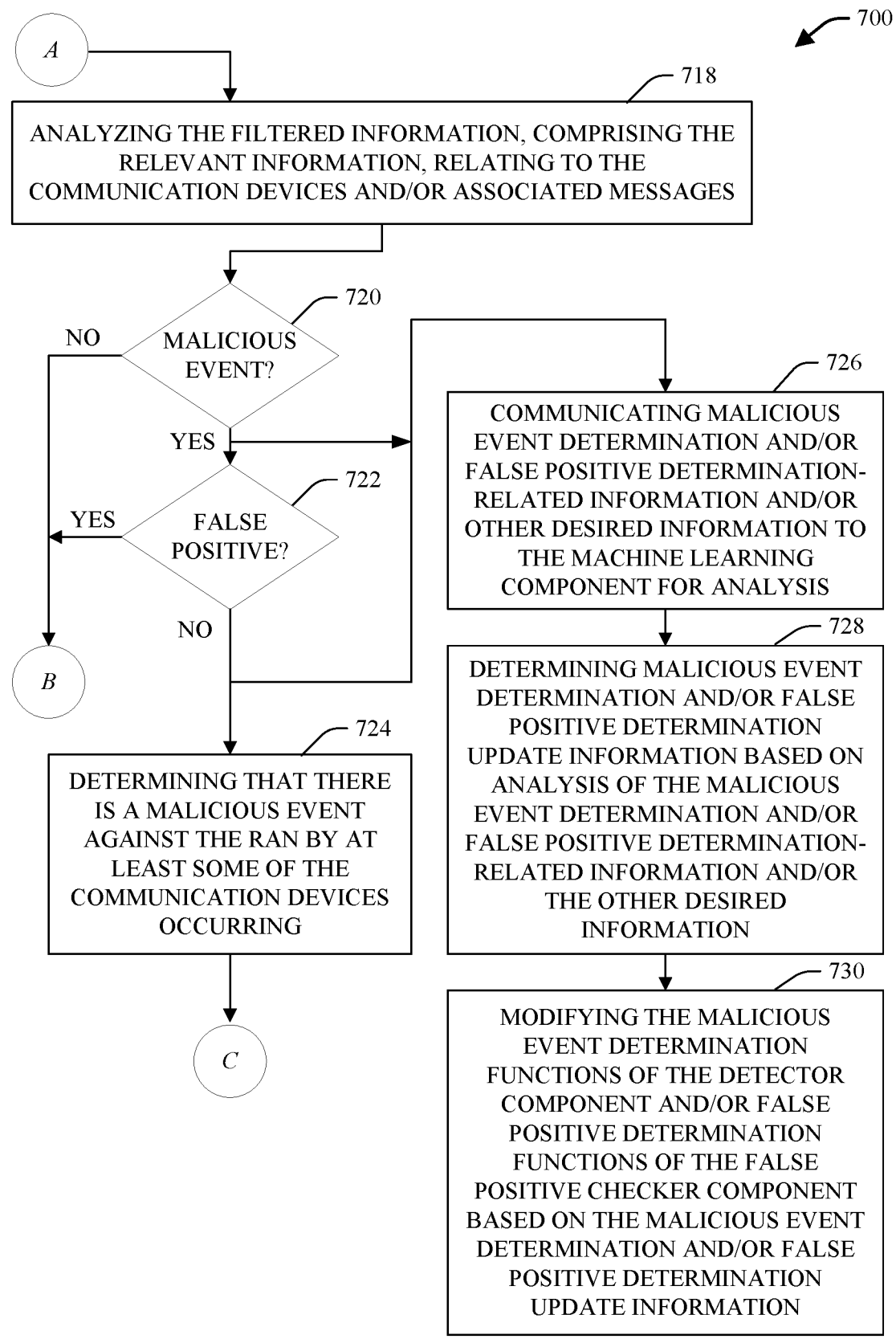
FIG. 8 illustrates a flow chart of a portion of the example method that can determine whether a malicious event against the RAN is occurring, and can update and enhance malicious event determination functions based at least in part on machine learning analysis, to facilitate detecting and mitigating malicious events against the RAN and managing connection of communication devices to the RAN, in accordance with various aspects and embodiments of the disclosed subject matter.

In some embodiments, at this point of the method 700, the method 700 can proceed to reference point A, wherein the method 700 can continue from reference point A, as described with regard to FIG. 8.

Referring again to reference numeral 708, in certain embodiments, additionally (or alternatively), the method 700 can proceed to reference numeral 712, wherein, at 712, parsing and/or filtering-related information relating to the parsing and/or filtering of the information relating to the communication devices and/or associated messages can be communicated to the machine learning component for analysis (e.g., machine learning analysis). The parser component and/or filter component of the SMC can communicate the parsing and/or filtering-related information to the machine learning component for analysis. The parsing and/or filtering-related information can comprise the parsed information, the filtered and/or relevant information, the purged information, information relating to the parsing criteria employed by the parser component, and/or information relating to the filtering criteria employed by the filter component.

At 714, parsing and/or filtering update information can be determined based at least in part on an analysis (e.g., machine learning analysis) of the parsing and/or filtering-related information. The machine learning component of the SMC can perform machine learning analysis on the parsing and/or filtering-related information using machine learning techniques and algorithms. Based at least in part on the results of such analysis, the machine learning component can determine the parsing and/or filtering update information that can be used to update the parser component and/or filter component, respectively, to enhance the parsing and/or filtering of information relating to communication devices and/or associated messages by the parser component and/or filter component, respectively, in accordance with the defined network security criteria.

For instance, the machine learning component can employ machine learning techniques and algorithms to learn (e.g., learn over time) how to enhance (e.g., improve or optimize) parsing and filtering of information relating communication devices and/or associated messages to facilitate determining relevant information from the information relating communication devices and/or associated messages, filtering the information to generate the filtered information, comprising the relevant information, and purging undesired information (e.g., information determined to not be sufficiently relevant), in accordance with the defined network security criteria, such as more fully described herein. The machine learning component can determine the parsing and/or filtering update information (e.g., feedback information) relating to such enhancement of the parsing and filtering of the information relating communication devices and/or associated messages. The machine learning component can communicate the parsing and/or filtering update information relating to such enhancement of the parsing and filtering to the parser component and/or filter component.

At 716, the parsing functions of the parser component and/or filtering functions of the filter component can be modified based at least in part on the parsing and/or filtering update information. The SMC can modify the parsing functions of the parser component and/or the filtering functions of the filter component, based at least in part on the parsing and/or filtering update information, to enhance the parsing of information relating communication devices and/or associated messages (e.g., as performed at reference numeral 706 of the method 700) and enhance the determination of relevant information and filtering of the parsed information to generate filtered information, comprising relevant information, and purge the undesired (e.g., remaining) information (e.g., as performed at reference numeral 708).

FIG. 8 illustrates a flow chart of a portion of the example method 700 that can determine whether a malicious event against the RAN is occurring, and can update and enhance malicious event determination functions based at least in part on machine learning analysis, to facilitate detecting and mitigating malicious events against the RAN and managing connection of communication devices to the RAN, in accordance with various aspects and embodiments of the disclosed subject matter. In some embodiments, the method 700 can proceed from reference point A of the method 700, as shown in FIGS. 7 and 8.

At 718, the filtered information, comprising the relevant information, relating to the communication devices and/or associated messages can be analyzed to facilitate determining whether a malicious event is occurring. The SMC, employing the detector component, can analyze the filtered information, comprising the relevant information, relating to the communication devices and/or associated messages, in relation to a defined baseline, to facilitate determining whether a malicious event (e.g., malicious attack) against the RAN by at least some of the communication devices is occurring. The defined baseline can indicate whether a malicious event is occurring against the RAN. For instance, the detector component can analyze the filtered information to determine respective characteristics associated with the respective communication devices, wherein the respective characteristics associated with the respective communication devices can be utilized to facilitate determining whether there is a malicious event against the RAN occurring. As part of the analysis, the detector component can compare respective parameters (e.g., parameter values) of the respective characteristics against corresponding baseline parameters of the defined baseline to determine whether the defined baseline has been satisfied (e.g., met or exceeded, or breached) to indicate that a malicious event against the RAN is occurring.

At 720, a determination (e.g., preliminary or initial determination) can be made regarding whether a malicious event against the RAN is occurring based at least in part on the analysis results and the defined baseline, wherein the defined baseline can indicate whether a malicious event is occurring against the RAN. For instance, the detector component can compare the respective characteristics (e.g., the respective characteristics and/or respective parameters of the respective characteristics) associated with the respective communication devices to the defined baseline (e.g., baseline parameters of the defined baseline), such as described herein, wherein the defined baseline can relate to various characteristics of communication devices, and wherein the various characteristics and/or associated parameters (e.g., baseline parameters) of such characteristics of the defined baseline can indicate whether a malicious event against the RAN by at least some of the communication devices is occurring. Initially, the detector component can employ a default or initial defined baseline, as more fully described herein. Over time, the SMC can modify or adapt the defined baseline based at least in part on baseline updates to the defined baseline, wherein the baseline updates can be determined by the machine learning component. The machine learning component can employ machine learning techniques and algorithms to learn how to enhance detection of malicious events against the RAN and, accordingly, can determine the baseline updates for the defined baseline, based at least in part on such learning, to enhance the detection of malicious events against the RAN, as more fully described herein.

In certain embodiments, the defined baseline can comprise one or more threshold parameter values associated with one or more parameters (e.g., baseline parameters) of one or more characteristics. If a parameter value of a characteristic of the respective characteristics associated with the communication devices satisfies the applicable threshold parameter value (e.g., breaches the applicable threshold parameter value), the detector component can determine that such satisfaction of the applicable threshold parameter value can be indicative of a malicious event against the RAN occurring. Based at least in part on the results of the comparison of the respective characteristics associated with the respective communication devices to the defined baseline, the detector component can determine (e.g., can make a preliminary or initial determination) whether a malicious event against the RAN by at least some of the communication devices is occurring.

For instance, if, based on the comparison results from the comparison to the defined baseline, the detector component determines that there is sufficient evidence of a malicious event against the RAN occurring (e.g., due to certain parameter values of certain parameters associated with certain characteristics satisfying their respective defined threshold parameter values), the detector component can render a determination (e.g., can make a preliminary or initial determination) that a malicious event against the RAN by at least some of the communication devices is occurring, in accordance with the defined network security criteria. If, instead, based on the comparison results from the comparison to the defined baseline, the detector component determines that there is not sufficient evidence of a malicious event against the RAN occurring (e.g., due to a lack of certain parameter values of certain parameters associated with certain characteristics satisfying their respective defined threshold parameter values), the detector component can render a determination (e.g., can make a preliminary or initial determination) that there is no malicious event against the RAN occurring, in accordance with the defined network security criteria.

In response to determining (at reference numeral 720) that there is no malicious event against the RAN occurring, the method 700 can proceed to reference point B, wherein the method 700 can return to reference numeral 702 (as shown in FIG. 7) and communication devices attempting to connect, or connected, to the RAN of the communication network can continue to be monitored. For instance, in response to the detector component determining that there is no malicious event against the RAN occurring, based at least in part on the comparison results and the defined baseline, the SMC can continue to monitor the communication network, or portion thereof, including monitoring the RAN and communication devices attempting to connect, or already connected, to the RAN.

If, instead, at reference numeral 720, it is determined (e.g., preliminary or initial determination) that a malicious event against the RAN by at least some of the communication devices is occurring, at 722, a determination can be made regarding whether the preliminary determination of a malicious event against the RAN is a false positive. In response to the detector component determining (e.g., at least a preliminary or initial determination) that there is a malicious event against the RAN occurring, based at least in part on the comparison results and the defined baseline, the SMC can employ a false positive checker component to determine whether or not such determination of a malicious event against the RAN is a false positive indication of a malicious event against the RAN.

For instance, the false positive checker component can perform additional analysis (e.g., deeper analysis) on the information relating the communication devices and/or associated messages, including the respective characteristics associated with the respective communication devices. Based at least in part on the results of such analysis, the false positive checker component can determine whether such determination of a malicious event against the RAN is a false positive indication of a malicious event against the RAN or not, as more fully described herein.

In some embodiments, the SMC can employ the machine learning component that can employ machine learning techniques and algorithms to learn, over time, how to enhance determination or detection of false positive determinations of malicious events against the RAN. For instance, the machine learning component can analyze historical and/or current information relating to communication devices and/or associated messages, and historical and/or current information relating to preliminary determinations regarding malicious events against the RAN and false positive determinations regarding malicious events against the RAN. The machine learning component can learn to better determine or detect false positive determinations of malicious events against the RAN, based at least in part on the results of such analysis. Based at least in part on such machine learning, the machine learning component can determine updates that can be made to the false positive checker component to enhance (e.g., improve or optimize) the determination or detection of false positive determinations of malicious events against the RAN, as more fully described herein. At desired times, the false positive checker component can be updated based at least in part on such updates determined by the machine learning component.

If, at 722, it is determined that the preliminary determination of a malicious event against the RAN is a false positive, it can be determined that there is no malicious event against the RAN occurring, and the method 700 can proceed to reference point B, wherein the method 700 can return to reference numeral 702 (as shown in FIG. 7) and communication devices attempting to connect, or already connected, to the RAN of the communication network can continue to be monitored. For instance, in response to the false positive checker component determining that there is no malicious event against the RAN occurring, based at least in part on the analysis results performed by the false positive checker component, the SMC can continue to monitor the communication network, or portion thereof, including monitoring the RAN and communication devices attempting to connect, or already connected, to the RAN.

If, instead, at reference numeral 722, it is determined that the preliminary determination of a malicious event against the RAN is not a false positive, at 724, it can be determined that there is a malicious event against the RAN by at least some of the communication devices occurring. For example, in response to the false positive checker component determining that the preliminary determination of a malicious event against the RAN occurring is not a false positive, based at least in part on the analysis results performed by the false positive checker component, the SMC (e.g., detector component or false positive checker component of the SMC) can determine that there is a malicious event against the RAN by at least some of the communication devices occurring. At this point, the method 700 can proceed to reference point C, wherein the method 700 can continue from reference point C, as described with regard to FIG. 9.

In certain embodiments, additionally (or alternatively), the method 700 can proceed to reference numeral 726, wherein, at 726, malicious event determination and/or false positive determination-related information relating to the malicious event determinations and/or false positive determinations and/or other desired (e.g., pertinent) information can be communicated to the machine learning component for analysis (e.g., machine learning analysis). The detector component and/or the false positive checker component can communicate the malicious event determination and/or false positive determination-related information relating to the malicious event determinations and/or false positive determinations and/or the other desired information to the machine learning component for analysis. The malicious event determination and/or false positive determination-related information can comprise the respective information analyzed by the detector component and false positive checker component in connection with rendering their respective determinations regarding malicious events, information relating to the malicious event determination criteria employed by the detector component, and/or information relating to the false positive determination criteria employed by the false positive checker component. The other desired information that can received by the machine learning component can comprise, for example, the parsing and/or filtering-related information received from the parser component and/or filter component, and/or the priority device determination-related information relating to determining or distinguishing between communication devices associated with priority communications and communication devices associated with non-priority communications, which can be received from the connection manager component of the SMC, such as described herein.

At 728, malicious event determination and/or false positive determination update information can be determined based at least in part on an analysis (e.g., machine learning analysis) of the malicious event determination and/or false positive determination-related information and/or the other desired information. Utilizing machine learning techniques and algorithms, the machine learning component can perform machine learning analysis on the malicious event determination and/or false positive determination information, the parsing and/or filtering-related information, the priority device determination-related information, and/or other desired information. Based at least in part on the results of such analysis, the machine learning component can determine the malicious event determination and/or false positive determination update information that can be used to update the detector component and/or false positive checker component, respectively, to enhance detection or determination of malicious events against the RAN and/or determination of whether a preliminary determination of a malicious event against the RAN is a false positive or not, respectively, in accordance with the defined network security criteria.

For instance, the machine learning component can employ machine learning techniques and algorithms to learn how to enhance (e.g., improve or optimize) detection or determination of malicious events against the RAN and/or determination of whether a preliminary determination of a malicious event against the RAN is a false positive or not, in accordance with the defined network security criteria, such as more fully described herein. Based at least in part on such learning, the machine learning component can determine the malicious event determination and/or false positive determination update information (e.g., feedback information) relating to such enhancement of the detection or determination of malicious events against the RAN and/or determination of whether a preliminary determination of a malicious event against the RAN is a false positive or not. The machine learning component can communicate the malicious event determination and/or false positive determination update information to the detector component and/or false positive checker component.

At 730, the malicious event determination functions of the detector component and/or false positive determination functions of the false positive checker component can be modified based at least in part on the malicious event determination and/or false positive determination update information. The SMC can modify the malicious event determination functions of the detector component and/or false positive determination functions of the false positive checker component, based at least in part on the malicious event determination and/or false positive determination update information, respectively, to enhance the detection or determination of malicious events against the RAN (e.g., as performed at reference numeral 720 of the method 700) and enhance the determination of whether a preliminary determination of a malicious event against the RAN is a false positive or not (e.g., as performed at reference numeral 722).

Figure 9:
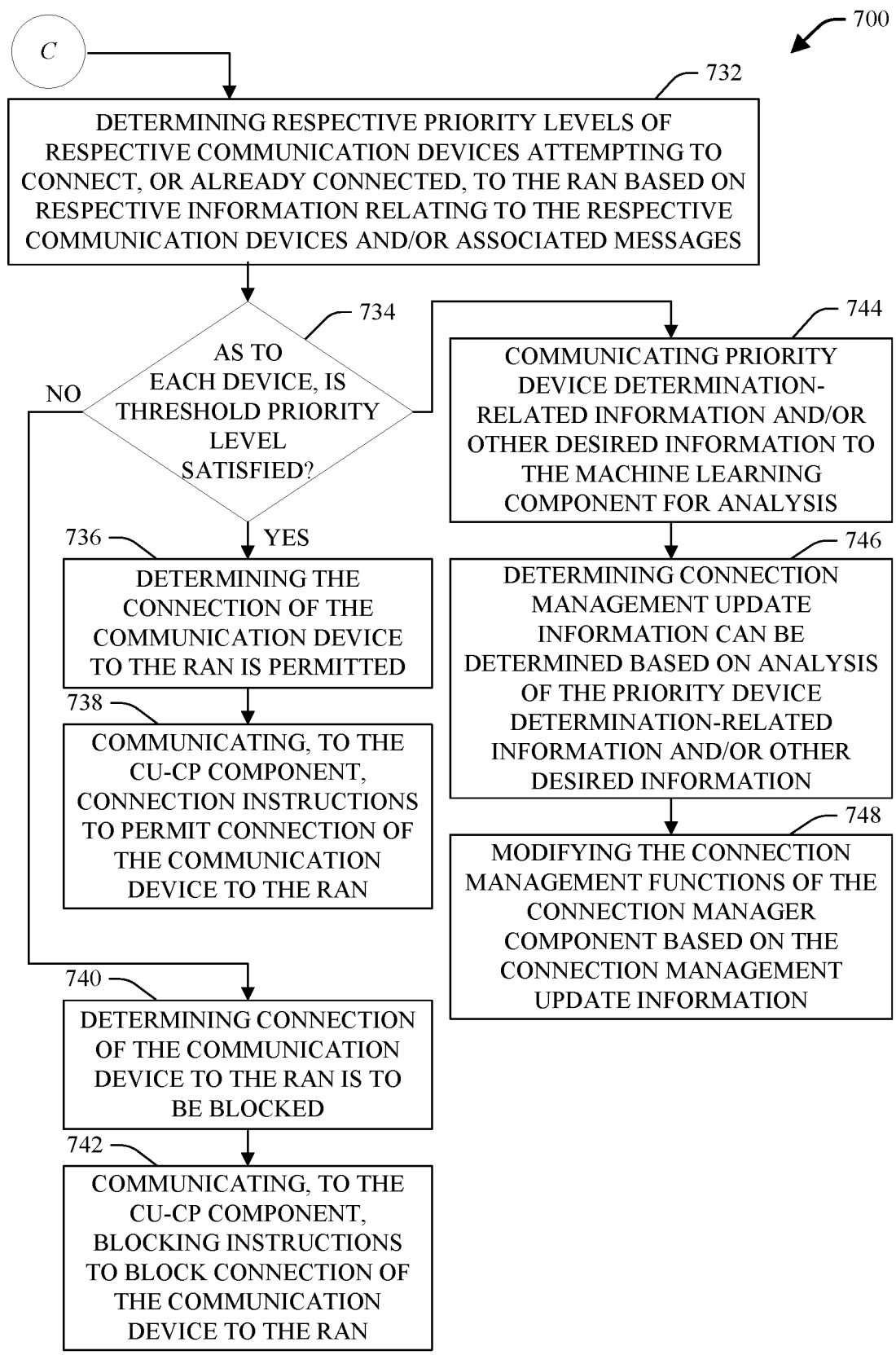
FIG. 9 presents a flow chart of another portion of the example method that can determine whether to allow or block connections of respective communication devices attempting to connect, or already connected, to the RAN, in response to a malicious event against the RAN, and can update and enhance device connection management functions based at least in part on machine learning analysis, to facilitate management of connection of communication devices to the RAN, in accordance with various aspects and embodiments of the disclosed subject matter.

FIG. 9 presents a flow chart of another portion of the example method 700 that can determine whether to allow or block connections of respective communication devices attempting to connect, or already connected, to the RAN, in response to a malicious event against the RAN, and can update and enhance device connection management functions based at least in part on machine learning analysis, to facilitate management of connection of communication devices to the RAN, in accordance with various aspects and embodiments of the disclosed subject matter. In some embodiments, the method 700 can proceed from reference point C of the method 700, as shown in FIGS. 8 and 9.

At 732, with regard to communication devices attempting to connect, or already connected, to the RAN during the malicious event, respective priority levels of respective communication devices attempting to connect, or already connected, to the RAN can be determined based at least in part on respective information relating to the respective communication devices and/or associated messages. The connection manager component can analyze the respective information relating to the respective communication devices and/or associated messages. Based at least in part on the results of such analysis, the connection manager component can determine the respective priority levels of the respective communication devices and/or associated messages.

At 734, with regard to each communication device attempting to connect, or already connected, to the RAN during the malicious event, a determination can be made regarding whether the priority level associated with the communication device or associated message satisfies a defined threshold priority level, in accordance with the defined security management criteria. With regard to each communication device, the connection manager component can compare the priority level associated with the communication device and/or associated message with the defined threshold priority level to determine whether the priority level satisfies (e.g., meets or exceeds) the defined threshold priority level. Based at least in part on the results of such comparison, the connection manager component can determine whether the priority level associated with the communication device or associated message satisfies the defined threshold priority level, wherein the defined threshold priority level can be determined in accordance with the defined security management criteria.

For each communication device, if, at 734, it is determined that the priority level associated with the communication device or associated message satisfies the defined threshold priority level, at 736, a determination can be made that the connection of the communication device to the RAN is permitted. With regard to each communication device, if the connection manager component determines that the priority level associated with the communication device or associated message satisfies the defined threshold priority level, the connection manager component can determine that the communication device is permitted to be connected to the RAN (e.g., permitted to connect to or to remain connected to the RAN).

At 738, connection instructions to permit connection of the communication device can be communicated to the CU-CP component of the RAN. With regard to each communication device that is permitted to connect to the RAN, the connection manager component can generate connection instructions to permit connection, or permit the continuance of a connection, of the communication device to the RAN, and can communicate those connection instructions to the CU-CP component of the RAN. The CU-CP component can connect or facilitate connecting, or maintain or facilitate maintaining a connection of, the communication device to the RAN, in response to the connection instructions.

Referring again to reference numeral 734, if, at 734, it is determined that the priority level associated with the communication device or associated message does not satisfy the defined threshold priority level, at 740, a determination can be made that connection of the communication device to the RAN is to be blocked. With regard to each communication device, if the connection manager component determines that the priority level associated with the communication device or associated message does not satisfy the defined threshold priority level, the connection manager component can determine that the communication device is to be blocked from connecting to the RAN (e.g., a communication device attempting to connect to the RAN is to be prevented from connecting to the RAN, or a communication device connected to the RAN is to have its connection to the RAN removed, terminated, or discontinued).

At 742, blocking instructions to block connection of the communication device to the RAN can be communicated to the CU-CP component of the RAN. With regard to each communication device that is to be blocked from connecting to the RAN, the connection manager component can generate blocking instructions to disallow, block, or discontinue connection of the communication device to the RAN, and can communicate those blocking instructions to the CU-CP component of the RAN. The CU-CP component can block or facilitate blocking (e.g., prevent connection or discontinue connection of) the communication device from connecting to, or remaining connected to, the RAN, in response to the blocking instructions.

Referring again to reference numeral 734, in certain embodiments, additionally (or alternatively), the method 700 can proceed from reference numeral 734 to reference numeral 744, wherein, at 744, priority device determination-related information relating to determining or distinguishing between communication devices associated with priority communications and communication devices associated with non-priority communications, and/or other desired (e.g., pertinent) information, can be communicated to the machine learning component for analysis (e.g., machine learning analysis). The connection manager component can communicate the priority device determination-related information and/or other desired information to the machine learning component for analysis. The priority device determination-related information can comprise the information analyzed by the connection manager component in connection with rendering determinations regarding the respective priority levels of the respective communication devices and determinations regarding whether the respective priority levels satisfy the defined threshold priority level, information relating to the defined threshold priority level, and/or information relating to the connection management criteria, including blocking criteria, employed by the connection manager component. The other desired information that can received by the machine learning component can comprise, for example, the parsing and/or filtering-related information, which can be received from the parser component and/or filter component, and/or the malicious event determination and/or false positive determination-related information relating to the malicious event determinations and/or false positive determinations, which can be received from the detector component and the false positive checker component, such as described herein.

At 746, connection management update information can be determined based at least in part on an analysis (e.g., machine learning analysis) of the priority device determination-related information and/or the other desired information. Utilizing machine learning techniques and algorithms, the machine learning component can perform machine learning analysis on the priority device determination-related information, the parsing and/or filtering-related information, the malicious event determination and/or false positive determination update information, and/or other desired information. Based at least in part on the results of such analysis, the machine learning component can determine the connection management update information that can be used to update the connection manager component to enhance determinations regarding whether to block connections of communication devices or allow connections of communication devices to the RAN during a malicious event against the RAN.

For example, the machine learning component can employ machine learning techniques and algorithms to learn how to enhance (e.g., improve or optimize) determinations regarding whether to block or allow connections of communication devices to the RAN during a malicious event against the RAN, in accordance with the defined network security criteria, such as more fully described herein. Based at least in part on such learning, the machine learning component can determine the connection management update information (e.g., feedback information) relating to such enhancement of the determinations regarding whether to block or allow connections of communication devices to the RAN during a malicious event against the RAN. The machine learning component can communicate the connection management update information to the connection manager component to facilitate updating the connection management functions of the connection manager component.

At 748, the connection management functions of the connection manager component can be modified based at least in part on the connection management update information. The SMC can modify the connection management functions of the connection manager component, based at least in part on the connection management update information to enhance determinations of priority levels associated with communication devices and associated messages (e.g., as performed at reference numeral 732 of the method 700), determination of the defined threshold priority level utilized at reference numeral 734, determinations regarding whether priority levels associated with communication devices and associated messages satisfy the defined threshold priority level (e.g., as performed at reference numeral 734), determinations regarding whether a communication device is to be permitted to connect to the RAN (e.g., as performed at reference numeral 736), and/or determinations regarding whether a communication device is to be blocked from connection to the RAN (e.g., as performed at reference numeral 740).

Figure 10:
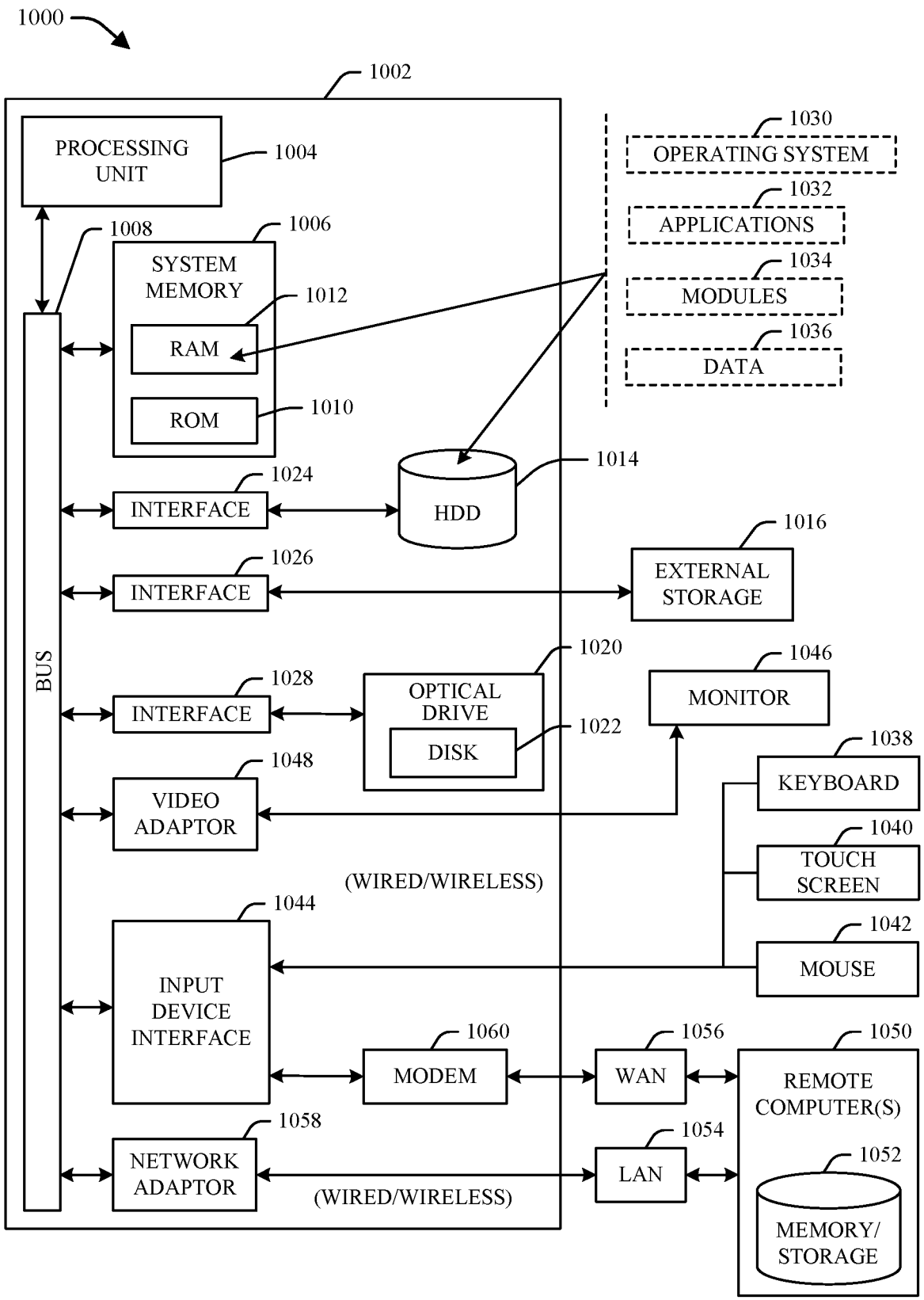
FIG. 10 is a schematic block diagram illustrating a suitable computing environment in which the various embodiments of the embodiments described herein can be implemented.

In order to provide additional context for various embodiments described herein, FIG. 10 and the following discussion are intended to provide a brief, general description of a suitable computing environment 1000 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH' interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056, e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

It is to be noted that aspects, features, and/or advantages of the disclosed subject matter can be exploited in substantially any wireless telecommunication or radio technology, e.g., Wi-Fi; Gi-Fi; Hi-Fi; BLUETOOTH™; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); etc. Additionally, some or all of the aspects described herein can be exploited in legacy telecommunication technologies, e.g., GSM. In addition, mobile as well non-mobile networks (e.g., the internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication device, RAN, MC, base station, communication network, security management component, detector component, connection manager component, machine learning component, processor component, data store, . . . ), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
    determining, by a system comprising a processor, whether there is an occurrence of a malicious event relating to a disruption of a service associated with radio access network equipment by a portion of a group of devices, based on analysis of information relating to respective characteristics associated with respective devices of the group of devices and a defined baseline that indicates whether the malicious event is occurring, wherein the group of devices comprises a first device and a second device; and
    with regard to the first device and the second device attempting to connect to, and prior to connection to, the radio access network equipment, and in response to determining that there is the occurrence of the malicious event:
        determining, by the system, a first level of criticality associated with a first message attempted to be communicated by the first device, and a second level of criticality associated with a second message attempted to be communicated by the second device, based on the analysis;
        determining, by the system, that the first device is to be connected to the radio access network equipment to communicate the first message based on the first level of criticality being determined to satisfy a defined threshold level of criticality; and
        determining, by the system, that the second device is to be prevented from connecting to the radio access network equipment based on the second level of criticality being determined not to satisfy the defined threshold level of criticality.

2. The method of claim 1, wherein the group of devices is a first group of devices associated with a radio access network comprising the radio access network equipment, wherein the analysis of the information is a first analysis of first information relating to the respective characteristics associated with the respective devices of the first group of devices and the defined baseline, and wherein the method further comprises:
    adapting, by the system, a previous defined baseline to generate the defined baseline based on a second analysis of second information relating to a previous attempted malicious event against the radio access network equipment by a previous group of devices associated with the radio access network.

3. The method of claim 1, wherein the group of devices is a first group of devices associated with a radio access network comprising the radio access network equipment, wherein the analysis of the information is a first analysis of first information relating to the respective characteristics associated with the respective devices of the first group of devices and the defined baseline, and wherein the method further comprises:
    performing, by the system, a second analysis of second information relating to a second group of devices associated with the radio access network equipment; and
    determining, by the system, an update to the defined baseline, based on the second analysis of the second information, to generate an updated defined baseline that facilitates indicating whether a subsequent malicious event to disrupt the service associated with the radio access network equipment is occurring.

4. The method of claim 3, wherein the determining of the update to the defined baseline to generate the updated defined baseline comprises:
    based on applying a machine learning function to the second information and feedback information, determining the updated defined baseline that facilitates indicating whether the subsequent malicious event to disrupt the service associated with the radio access network equipment is occurring, wherein the feedback information comprises result information relating to a result of the determining whether there is the occurrence of the malicious event relating to the disruption of the service associated with the radio access network equipment by the portion of the group of devices.

5. The method of claim 1, wherein the information comprises respective items of attach request information or respective data communications received from the respective devices, and wherein an item of attach request information of the respective items of attach request information relates to an attach request or an attach update request.

6. The method of claim 1, wherein the respective characteristics comprise or relate to a type of device of the first device, a device identifier associated with the first device, a location of the first device, a first number of devices of the group of devices located within a defined area, a second number of devices of the group of devices located within a defined distance of each other, a type of request or data communication associated with the first device, the first level of criticality associated with the first device or the first message, or a time associated with the request, the data communication, or an item of information associated with the first device.

7. The method of claim 1, further comprising:
determining, by the system, that the first level of criticality associated with the first message satisfies the defined threshold level of criticality, based on a first evaluation of a first characteristic associated with the first device or the first message; and
determining, by the system, that the second level of criticality associated with the second message does not satisfy the defined threshold level of criticality, based on a second evaluation of a second characteristic associated with the second device or the second message.

8. The method of claim 1, wherein the malicious event relates to a distributed denial of service attack by the portion of the group of devices.

9. The method of claim 1, further comprising:
in response to the determining that the second device is to be prevented from connecting to the radio access network equipment, transmitting, by the system, instructions to the radio access network equipment to instruct the radio access network equipment to prevent the connection of the second device to the radio access network equipment.

10. The method of claim 1, further comprising:
determining, by the system, that the first message is an emergency message, a mission critical message, or a priority message that is associated with the first level of criticality associated with the first message, based on an evaluation of the first characteristic associated with the first device or the first message, in accordance with a defined network security criterion.

11. The method of claim 1, further comprising:
determining, by the system, the respective characteristics associated with the respective devices of the group of devices based on the analysis of the information; and
determining, by the system, a preliminary result that initially indicates that there is the occurrence of the malicious event, based on the respective characteristics associated with the respective devices.

12. The method of claim 11, further comprising:
determining, by the system, whether the preliminary result that initially indicates that there is the occurrence of the malicious event is a false positive indication of the occurrence of the malicious event, based on a subsequent analysis of the respective characteristics associated with the respective devices and feedback information relating to false positive determinations of malicious events that is received from a machine learning function, wherein the feedback information is determined based on whether a non-malicious event is occurring, has occurred, or is predicted to occur within a defined amount of time of communication of messages by the group of devices, and wherein the non-malicious event is expected to cause a first amount of communication of messages to be communicated via the radio access network equipment that is higher than a second amount of communication of messages expected to be communicated via the radio access network equipment with regard to a non-occurrence of the non-malicious event; and
one of:
determining, by the system, that the preliminary result is the false positive indication of the occurrence of the malicious event, and the malicious event did not occur, based on a first result of the subsequent analysis of the respective characteristics associated with the respective devices and the feedback information relating to the false positive determinations of the malicious events; or
determining, by the system, that the preliminary result is not the false positive indication of the occurrence of the malicious event, and the malicious event has occurred, based on a second result of the subsequent analysis of the respective characteristics associated with the respective devices and the feedback information relating to the false positive determinations of the malicious events.

13. The method of claim 1, further comprising:
parsing, by the system, the information based on a first result of the analysis of the information;
based on a second result of the parsing, filtering, by the system, the information to generate filtered information relating to the respective characteristics associated with the respective devices, wherein the filtered information comprises some of the information relating to the respective characteristics associated with the respective devices that is determined to satisfy a defined network security criterion relating to information relevancy,
wherein the determining whether there is the occurrence of the malicious event comprises determining whether there is the occurrence of the malicious event relating to the disruption of the service associated with the radio access network equipment by the portion of the group of devices attempting to connect, or connected, to the radio access network equipment, based on the filtered information and the defined baseline that indicates whether the malicious event is occurring; and
communicating, by the system, the filtered information to a machine learning function for subsequent analysis by the machine learning function.

14. A system, comprising:
a processor; and
a memory that stores executable instructions that, when executed by the processor, facilitate performance of operations, the operation comprising:
determining whether there is an existence of a malicious attack involving a portion of a group of devices associated with a radio access network device of a communication network to disrupt a service associated with the radio access network device, based on analysis of data relating to respective attributes associated with respective devices of the group of devices and a defined baseline that indicates whether the malicious attack exists, wherein the group of devices comprises a first device and a second device; and with regard to the first device and the second device attempting to connect to the radio access network device, and in response to determining that there is the existence of the malicious attack:

determining a first priority level associated with a first message attempted to be communicated by the first device, and a second priority level associated with a second message attempted to be communicated by the second device, based on the analysis;

determining that the first device is to be connected to the radio access network device to communicate the first message based on the first priority level being determined to satisfy a defined threshold priority level; and determining that the second device is to be blocked from connecting to the radio access network device based on the second priority level being determined not to satisfy the defined threshold priority level.

15. The system of claim 14, wherein the operations further comprise:

determining that the first priority level associated with the first message satisfies the defined threshold priority level, based on a first evaluation of a first attribute associated with the first device or the first message; and determining that the second priority level associated with the second message does not satisfy the defined threshold priority level, based on a second evaluation of a second attribute associated with the second device or the second message, wherein the respective attributes comprise the first attribute and the second attribute.

16. The system of claim 14, wherein the operations further comprise:

in response to determining that the second device is to be blocked from connecting to the radio access network device, communicating instructions to the radio access network device to instruct the radio access network device to block or prevent the connection of the second device to the radio access network device.

17. The system of claim 14, wherein the operations further comprise:

determining that the first message is an emergency message, a mission critical message, or a priority message that is associated with the first priority level, based on an evaluation of an attribute associated with the first device or the first message, in accordance with a defined network security criterion, wherein the respective attributes comprise the attribute.

18. The system of claim 14, wherein the analysis of the data relating to the group of devices is a first analysis of the first data relating to a first group of devices, and wherein the operations further comprise:

performing a second analysis of second data relating to a second group of devices associated with the radio access network device;

based on the second analysis of the second data, determining an update to the defined baseline; and generating an updated defined baseline based on update information representative of the update, wherein the updated defined baseline is usable to indicate whether a subsequent malicious attack to disrupt the service associated with the radio access network device is occurring.

19. A non-transitory machine-readable medium, comprising executable instructions that, when executed by a processor, facilitate performance of operations, the operations comprising:

determining whether there is an occurrence of a malicious event relating to a portion of a group of user equipment associated with a radio access network equipment of a communication network to disrupt a service associated with the radio access network equipment, based on evaluation of information relating to respective characteristics associated with respective user equipment of the group of user equipment and a defined baseline that indicates whether the malicious event is occurring, wherein the group of user equipment comprises a first user equipment and a second user equipment; and in connection with the first user equipment and the second user equipment attempting to attach to the radio access network equipment, and in response to determining that there is the occurrence of the malicious event:

determining a first priority level associated with a first message attempted to be communicated by the first user equipment, and a second priority level associated with a second message attempted to be communicated by the second user equipment, based on the evaluation;

determining that the first user equipment is permitted to be attached to the radio access network equipment to communicate the first message based on the first priority level being determined to satisfy a defined threshold priority level; and determining that the second user equipment is not permitted to be attached to the radio access network equipment based on the second priority level being determined not to satisfy the defined threshold priority level.

20. The non-transitory machine-readable medium of claim 19, wherein the operations further comprise:

determining that the first priority level associated with the first message satisfies the defined threshold priority level, based on a first evaluation of a first characteristic associated with the first user equipment or the first message; and determining that the second priority level associated with the second message does not satisfy the defined threshold priority level, based on a second evaluation of a second characteristic associated with the second user equipment or the second message, wherein the evaluation comprises the first evaluation and the second evaluation.

* * * * *